(12) United States Patent
Bures et al.

(10) Patent No.: US 6,718,076 B2
(45) Date of Patent: Apr. 6, 2004

(54) ACOUSTO-OPTIC TUNABLE FILTER WITH SEGMENTED ACOUSTO-OPTIC INTERACTION REGION

(75) Inventors: Kenneth J. Bures, Marblehead, MA (US); Dogan Gunes, North Andover, MA (US); Chunghsin Lee, Lynnfield, MA (US); Paul Maki, Harvard, MA (US); Piero Sferlazzo, Marblehead, MA (US)

(73) Assignee: Unaxis USA, Inc., St. Petersburg, FL (US)

( * ) Notice: Subject to any disclaimer, the term of this patent is extended or adjusted under 35 U.S.C. 154(b) by 0 days.

(21) Appl. No.: 10/104,494

(22) Filed: Mar. 22, 2002

(65) Prior Publication Data

US 2003/0179975 A1 Sep. 25, 2003

(51) Int. Cl.⁷ .............................................. G02F 1/335
(52) U.S. Cl. ................... 385/7; 385/4; 385/11; 385/32; 359/285; 359/305; 381/337; 372/13
(58) Field of Search ............................... 385/4, 7, 9, 11, 385/14, 15, 18, 24, 27, 28, 31, 32, 39, 42, 43, 45, 47, 50; 359/285, 305, 119, 127; 370/310; 398/59, 82; 372/13; 381/337

(56) References Cited

U.S. PATENT DOCUMENTS

| | | | | |
|---|---|---|---|---|
| 5,652,809 A | * | 7/1997 | Aronson | 385/7 |
| 5,850,491 A | * | 12/1998 | Morasca et al. | 385/7 |
| 6,243,516 B1 | * | 6/2001 | Seino | 385/47 |
| 6,252,698 B1 | * | 6/2001 | Oikawa | 359/326 |
| 6,426,816 B1 | * | 7/2002 | Wu et al. | 398/65 |
| 6,594,069 B1 | * | 7/2003 | Nakazawa et al. | 359/308 |
| 2002/0101633 A1 | * | 8/2002 | Onaka et al. | 359/119 |
| 2003/0026558 A1 | * | 2/2003 | Miyata et al. | 385/110 |

FOREIGN PATENT DOCUMENTS

| | | | | |
|---|---|---|---|---|
| EP | 0938017 A1 | | 8/1999 | G02F/1/125 |
| JP | 11305179 A | * | 11/1999 | G02F/1/125 |
| WO | WO 98/04954 | | 2/1998 | G02F/1/313 |

OTHER PUBLICATIONS

Smith, David A., et al., "Integrated–Optic Acoustically–Tunable Filters for WDM Networks", IEEE Journal on Seledcted Areas in Communications, vol. 8, No. 6, pp. 1151–1159, Aug., 1990.

Harris, S.E., et al., "Acousto–Optic Tunable Filter", Journal of the Optical Society of America, vol. 59, No. 6, pp. 744–747, Jun. 1969.

(List continued on next page.)

Primary Examiner—Brian Healy
Assistant Examiner—Daniel Petkovsek
(74) Attorney, Agent, or Firm—Kurt Rauschenbach; Rauschenbach Patent Law Group, LLC

(57) ABSTRACT

An acousto-optic tunable filter that includes a polarization beamsplitter, a multi-segment interaction region and a polarization beam combiner is described. The polarization beamsplitter generates a first and a second polarized optical signal. The multi-segment optical interaction region includes a first optical interaction region and a first acoustic wave generator that generates acoustic waves in the first optical interaction region. The multi-segment optical interaction region also includes a second optical interaction region that is non-collinear relative to the first optical interaction region and a second acoustic wave generator that generates acoustic waves in the second optical interaction region. Optical signals that are phase-matched to the acoustic waves are mode-converted in response to the acoustic waves. The acousto-optic tunable filter also includes a polarization beam combiner that generates both a mode-converted optical signal and a non-mode-converted optical signal.

44 Claims, 15 Drawing Sheets

OTHER PUBLICATIONS

Smith, D.A., et al., "Source of Sidelobe Asymmetry in Integrated Acousto–Optic Filters", Appl. Phys. Lett 62 (8), pp. 814–816, Feb. 22, 1993.

Nakazawa, T., et al., "A Novel Beat Noise Reduction Method for AOTF", Symposium on Integrated Photonics Research, Jul. 12–15, 2000, Quebec, Canada, sponsored by Optical Society of America, technically cosponsored by IEEE/Lasers and Electro–Optics Society.

Nakazawa, T., et al., "Ti: LiNbO3 Acousto–Optic Tunable Filter (AOTF)", FUJITSU Sci. Tech. J. 35, 1, pp. 107–112, Jul., 1999.

Smith, David A., et al., "Evolution of the Acousto–Optic Wavelength Routing Switch", reprinted from IEEE Journal of Lightwave Technology, vol. 14, No. 6, pp. 1005–1019, Jun. 1996.

Ramaswami, Rajiv, et al., from Optical Networks: A Practical Perspective, pp. 115–117, published in 1998 by Academic Press.

Green, Jr., Paul E., et al., from Fiber Optic Networks, pp. 129–143, published in 1993 by Prentice–Hall, Inc.

* cited by examiner

ACOUSTO-OPTIC TUNABLE FILTER WITH SEGMENTED ACOUSTO-OPTIC INTERACTION REGION

FIELD OF THE INVENTION

The present invention relates to optical devices. In particular, the present invention relates to optical devices that include optical interaction regions, such as optical filters and optical modulators.

BACKGROUND OF THE INVENTION

Acousto-optic tunable filters (AOTFs) are electrically-tunable optical filters. Wavelength tuning is accomplished by varying the surface acoustic wave frequency applied to the AOTFs. AOTFs are useful for optical filtering and add-drop multiplexing in wavelength division multiplexing (WDM) optical transport systems. WDM is an optical transport technology that propagates many wavelengths in the same optical fiber, thus effectively increasing the aggregate bandwidth per fiber to the sum of the bit rates of each wavelength. Dense Wavelength Division Multiplexing (DWDM) is a technology that implements WDM technology with a large number of wavelengths. DWDM is typically used to describe WDM technology that propagates more than 40 wavelengths in a single optical fiber.

As the number of wavelengths increases, the channel width and channel spacing decreases. To achieve the required channel width and channel spacing in DWDM communication systems, high quality, high performance optical filters are required. In order to function properly, these optical filters generally must exhibit low loss and narrow band transmission characteristics over the wavelength spectrum of 1.3 $\mu$m to 1.55 $\mu$m. These filters generally must also have good mechanical properties and must be stable in typical operating environments.

AOTFs are particularly advantageous for use in WDM optical transport systems because they can achieve narrow passbands and broad tuning ranges. In fact, an AOTF can have a tuning range that is substantially the entire wavelength range of an optical fiber communication system, which can typically be approximately from 1.3 $\mu$m to 1.6 $\mu$m. Also, AOTFs have the unique capability of simultaneous multi-channel filtering. By simultaneous multi-channel filtering we mean that an AOTF can select several wavelength channels simultaneously by applying multiple acoustic wave signals. In addition, AOTFs can be configured as add-drop multiplexers. Add-drop multiplexers are used in WDM optical transport systems for adding and dropping one or more channels while preserving the integrity of the other channels.

AOTFs include a narrowband polarization converter that is positioned between an input and an output polarizing element. The polarization converter changes one polarization mode to an orthogonal polarization mode. Light having a wavelength range within the passband of the filter propagates through the input polarizing element and then is converted to an orthogonal state of polarization. The converted light then propagates through the output polarization element.

The degree of polarization transformation depends on the magnitude of the polarization conversion, which is a function of the applied acoustic power density. However, the polarization converter is inoperative outside of the passband of the filter. Light having a wavelength range outside of the passband does not get converted by the polarization converter and, therefore, is blocked from propagating through the AOTF.

Known AOTFs have several practical limitations that have prevented them from being used in commercial WDM optical transport systems. For example, known AOTFs have relatively wide channel bandwidth and have relatively poor out-of-band signal suppression. Also, known AOTFs that are configured as multi-wavelength add/drop multiplexers experience coherent beating between multiple drive frequencies when performing multi-wavelength add/drops. This can lead to undesirable wavelengths being included when performing multi-wavelength add/drops.

SUMMARY OF THE INVENTION

The present invention relates to optical devices that include multi-segment optical interaction regions. In one embodiment, the present invention relates to AOTF devices having long interaction lengths. An AOTF according to the present invention divides the optical interaction region into a plurality of segments, such that the total combined length of the plurality of segments is the desired interaction length. In one embodiment, the plurality of segments comprises segments that are positioned adjacent to each other in numerous folded configurations.

AOTFs according to the present invention have a relatively low aspect ratio. By aspect ratio we mean the ratio of the physical length of the device to its physical width. Devices having low aspect ratios generally are more physically robust and axe generally easier to package. In addition, an AOTF according to the present invention can use smaller heaters or thermoelectric coolers and less complex temperature controllers compared with devices having higher aspect ratios. In one embodiment, AOTFs according to the present invention have a relatively high yield because the materials they are fabricated from are generally more uniform and generally the fabrication tolerances ate less demanding for devices with low aspect ratios. In one embodiment, devices with low aspect ratios are less expensive to manufacture because more or the devices can occupy a given sized substrate compared with devices having standard or higher aspect ratios Accordingly, in one aspect, the present invention is embodied in an acousto-optic tunable filter that includes a polarization beamsplitter for receiving an optical signal at a first optical input. The polarization beamsplitter generates a first and a second polarized optical signal at a first and a second optical output, respectively. In one embodiment, the polarization beamsplitter is formed in a substrate. In another embodiment, the polarization beamsplitter is a discrete planar device. In other embodiments, the polarization beamsplitter is a prism or other known polarization splitter device. In one embodiment, the first polarized optical signal is orthogonally polarized relative to the second polarized optical signal.

The acousto-optic tunable filter also includes a first optical interaction region having a first and a second optical waveguide optically coupled to the first and the second output of the polarization beamsplitter, respectively. The first optical interaction region also includes a first acoustic wave generator for generating acoustic waves in the first and the second optical waveguides. In one embodiment, the first optical interaction region is formed in a substrate. In another embodiment, the first optical interaction region is a discrete planar device. In another embodiment, the first optical interaction region includes a first and a second segment that are physically separate.

The acousto-optic tunable filter further includes a second optical interaction region having a third and a fourth optical waveguide optically coupled to the first and the second optical waveguide of the first optical interaction region, respectively. The second optical interaction region also includes a second acoustic wave generator for generating acoustic waves in the third and the fourth optical waveguides. The second optical interaction region is non-collinear relative to the first optical interaction region, thereby reducing the aspect ratio of the acousto-optic tunable filter.

In one embodiment, the second optical interaction region is formed in a substrate. In another embodiment, the second optical interaction region is a discrete planar device. In another embodiment, the second optical interaction region includes a first and a second segment that are physically separate. In one embodiment, the first optical interaction region and the second optical interaction region are discrete planar devices that are formed in a first and second physically separate substrate, respectively. In another embodiment, the first optical interaction region and the second optical interaction region are positioned adjacent to each other in a folded configuration. In yet another embodiment, the first optical interaction region is positioned in a non-parallel configuration relative to the second optical interaction region.

In one embodiment, the third and the fourth optical waveguides are optically coupled to the first and the second optical waveguides, respectively, with a first and a second optical fiber. The first and the second optical fibers can be positioned in a V-groove block.

In another embodiment, the third and the fourth optical waveguides are optically coupled to the first and the second optical waveguides with a fifth and a sixth optical waveguide. In one embodiment, the fifth and the sixth optical waveguides are curved. In another embodiment, the fifth and the sixth optical waveguides do not cross.

In yet another embodiment, the fifth and the sixth optical waveguides are ridge waveguides. In still another embodiment, the fifth and the sixth optical waveguides are channel waveguides. In one embodiment, the fifth and the sixth optical waveguides are disposed on discrete substrates.

The acousto-optic tunable filter also includes a polarization beam combiner having a first and a second input optically coupled to the third and the fourth optical waveguide of the second optical interaction region, respectively. The polarization beam combiner generates a substantially mode-converted optical signal at a first optical output in response to the acoustic waves generated by at least one of the first and the second acoustic wave generators. In one embodiment, the polarization beam combiner generates a non-mode-converted optical signal at a second optical output.

In one embodiment, the substantially mode-converted optical signal is phase-matched to the acoustic waves generated by at least one of the first and the second acoustic wave generators. In another embodiment, the substantially mode-converted optical signal comprises a wavelength that is inversely proportional to the frequency of the acoustic waves generated by at least one of the first and the second acoustic wave generators. The phase of the acoustic waves generated by the second acoustic wave generator is adjusted such that polarization mode conversion in the second optical interaction region is substantially coherent with polarization mode conversion in the first optical interaction region.

In one embodiment, the acousto-optic tunable filter also includes a third optical interaction region having a fifth and a sixth optical waveguide optically coupled to the third and the fourth optical waveguide, respectively. The third optical interaction region includes a third acoustic wave generator for generating acoustic waves in the fifth and the sixth optical waveguides. In another embodiment, the third optical interaction region is non-collinear relative to at least one of the first and the second optical interaction regions, thereby reducing the aspect ratio of the acousto-optic tunable filter.

In yet another embodiment, a phase of the acoustic waves generated by the third acoustic wave generator is adjusted such that polarization mode conversion in the third optical interaction region is substantially coherent with polarization mode conversion in at least one of the first optical interaction region and the second optical interaction region.

In one embodiment, the acousto-optic tunable filter optically processes a WDM optical signal in a WDM optical communication system. In another embodiment, the polarization beamsplitter, first optical interaction region, second optical interaction region, and polarization beam combiner are integrated on a single substrate. In yet another embodiment, at least one of the polarization beamsplitter, first optical interaction region, second optical interaction region, and polarization beam combiner comprises a discrete planar device. The discrete planar device can be formed on a physically separate substrate. The polarization beamsplitter can be a prism or other known polarization splitter device.

In another aspect, the present invention is embodied in a multi-segment acousto-optic interaction region. The multi-segment acousto-optic interaction region includes a first optical interaction region having a first optical waveguide with a first optical input and a first optical output. The multi-segment acousto-optic interaction region also includes a first acoustic wave generator for generating acoustic waves in the first optical waveguide.

The multi-segment acousto-optic interaction region includes a second optical interaction region that is non-collinear relative to the first optical interaction region. The second optical interaction region includes a second optical waveguide having a second optical input that is optically coupled to the first optical output of the first optical interaction region. The second optical interaction region also includes a second acoustic wave generator for generating acoustic waves in the second optical waveguide. The second optical interaction region generates a substantially mode-converted optical signal in response to the acoustic waves generated by at least one of the first and the second acoustic wave generators.

In another embodiment, the multi-segment acousto-optic interaction region includes a third optical interaction region. The third optical interaction region includes a third optical waveguide having a third optical input that is optically coupled to the second optical output of the second optical interaction region. The third optical interaction region also includes a third acoustic wave generator for generating acoustic waves in the third optical waveguide. In one embodiment, the third optical interaction region generates a substantially mode-converted optical signal in response to acoustic waves generated by at least one of the first, second, and third acoustic wave generators. In another embodiment, the third optical interaction region is non-collinear relative to at least one of the first and the second optical interaction regions.

In one embodiment, the second optical input of the second optical waveguide is optically coupled to the first optical output of the first optical interaction region by an optical fiber. In another embodiment, the second optical input is optically coupled to the first optical output by an optical waveguide. The optical waveguide can be a ridge optical waveguide. The optical waveguide can be a channel optical waveguide.

In another aspect, the present invention is embodied in a method of mode-converting an optical signal. The method includes generating acoustic waves in a first optical interaction region. The method also includes propagating the optical signal through the first optical interaction region. The method further includes generating acoustic waves in a second optical interaction region that is non-collinear relative to the first optical interaction region. The method further includes propagating the optical signal through the second optical interaction region, thereby substantially mode-converting the optical signal in response to the acoustic waves generated in the first and the second optical interaction regions.

In one embodiment, the first and the second optical interaction regions are positioned adjacent to each other in a folded configuration. In another embodiment, the first and the second optical interaction regions are positioned adjacent to each other in a non-parallel configuration. In another embodiment, the method further includes reflecting the optical signal propagating through the first optical interaction region into the second optical interaction region. In another embodiment, the method further includes propagating the optical beam from the first optical interaction region into the second optical interaction region with an optical fiber.

BRIEF DESCRIPTION OF THE DRAWINGS

This invention is described with particularity in the appended claims. The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
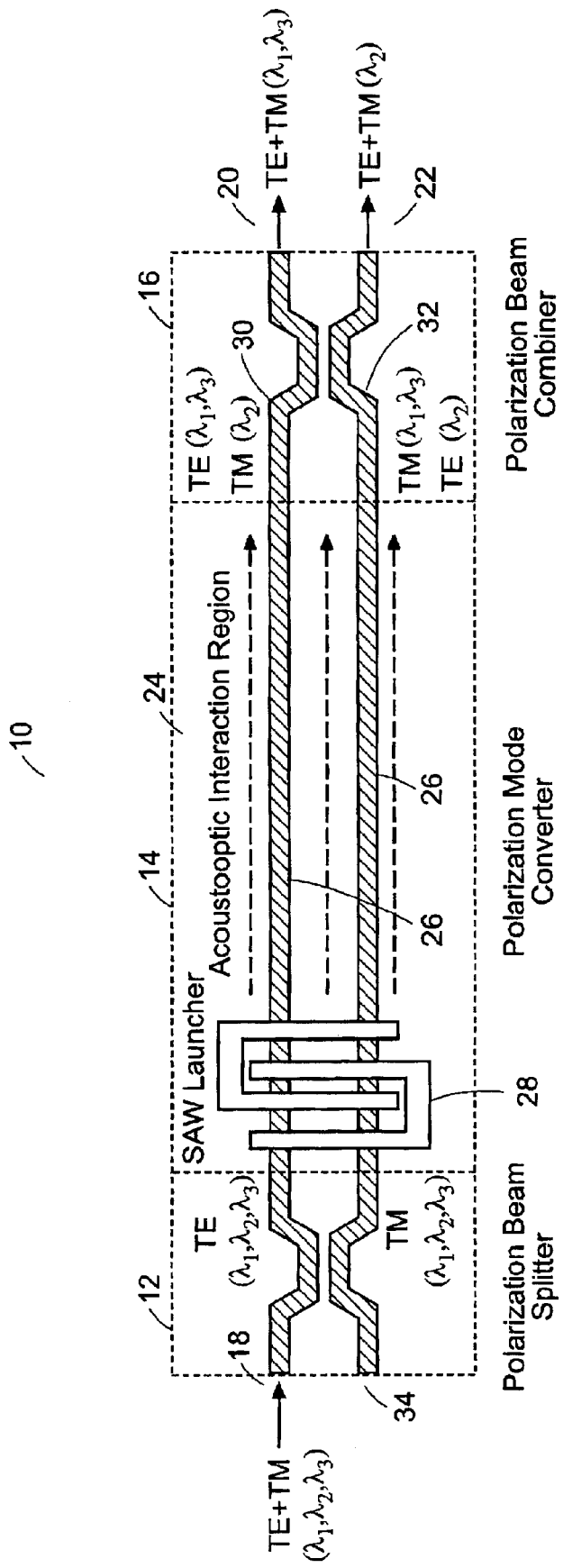
FIG. 1 illustrates a known integrated acousto-optic tunable filter.

FIG. 1 illustrates a known integrated acousto-optic tunable filter (AOTF) 10. The AOTF 10 includes an input polarization beamsplitter 12, a polarization mode-converter 14, and a polarization beam combiner 16. The polarization beamsplitter 12 receives an input light beam at a first input 18 and separates the input light beam into two orthogonal polarization states, which are typically the TE and TM modes. The two modes propagate through the polarization mode-converter 14 and are combined by the polarization beam combiner 16. The modes are either coupled straight through or crossed over to a first 20 and second output port 22 of the polarization beam combiner 16.

The polarization mode-converter 14 changes one polarization mode to another polarization mode by propagating light through an acousto-optic interaction region 24. The polarization mode-converter 14 includes a pair of parallel optical waveguides 26 that are formed in the surface of a substrate. Strain is induced in the acousto-optic interaction region by the piezoelectric effect. The substrate is a piezoelectric and a birefringent material that includes an off-diagonal term in the substrate material's strain-optic tensor. The elasto-optic tensor P relates the mechanical strain in the material to the optical index of refraction of the material. For example, lithium niobate has an off-axis elasto-optic tensor term of $p_{41}$.

The polarization mode-converter 14 also includes a surface acoustic wave (SAW) transducer, which in one configuration, is a set of inter-digitated conducting fingers 28 that are formed over or proximate to the pair of optical waveguides 26. The optical waveguides 26 carry the separated TE and TM modes that are formed by the polarization beamsplitter 12. A sinusoidal oscillator (not shown) that generates an acoustic waveform having a frequency $f_a$ is electrically connected to the conducting fingers 28. The sinusoidal oscillator drives the conducting fingers 28 and generates a surface acoustic wave (SAW) that propagates approximately collinearly along the pair of optical waveguides 26. In one configuration, the SAW itself is guided through the use of an acoustic waveguide structure.

The SAW causes an anisotropic perturbation of the indices of refraction in the pair of optical waveguides 26. This perturbation causes a mode conversion. By mode conversion, we mean a conversion of one mode to another mode (e.g. TE becomes TM, and TM becomes TE). The mode conversion occurs gradually as the optical signals propagate through the pair of optical waveguides 26. Mode conversion only occurs when phase matching criterion is satisfied. This is when the optical wavelength $\lambda_0$ and the acoustic drive frequency $f_a$ are related by the following expression:

$$f_a = \frac{\Delta n V_s}{\lambda_0} \quad (1)$$

where $\Delta n = n_{TM} - n_{TE}$ is the birefringence of the optical waveguide material, and $V_s$ is the speed of sound in the substrate material. Eventually, complete mode conversion of the phase-matching optical signals occurs. This is when substantially all of the TE mode is converted to the TM mode in one waveguide and substantially all of the TM mode is converted to the TE mode in the other waveguide of the pair of optical waveguides 26.

Mode conversion continues to occur as long as the acoustically generated perturbation is present. That is, after complete mode conversion, the just-formed TM mode begins to convert back to TE mode and the just-formed TE mode begins to convert back to the TM mode. The TE mode and the TM mode that are propagating through the pair of optical waveguides 26, thus could convert cyclically back and forth from pure TE to pure TM and then back again.

The AOTF 10 halts the mode conversion by terminating the acoustic signal with acoustic absorbers (not shown) that are positioned on the pair of optical waveguides 26 at specific locations. This ensures that the light beam having the phase-matching optical wavelength $\lambda_0$ will undergo substantially complete mode conversion. If the optical wavelength $\lambda_0$ of the light beam is not phase-matched to the acoustic frequency $f_a$, then substantially no mode conversion occurs, and the light beam simply propagates down the waveguide 26 with no change in polarization.

The polarization beam combiner 16 is physically identical to the polarization beamsplitter 12. However, the polarization beam combiner 16 is configured to combine rather than splits the light beams. The polarization beam combiner 16 has a first 30 and a second input port 32 that receives the TM mode and the TE mode.

Integrated AOTFs combine the polarization beamsplitter 12, polarization mode-converter 14, and the polarization beam combiner 16 on a planar substrate that is both birefringent and piezoelectric, such as lithium niobate. Discrete AOTFs use separate polarization beamsplitters, polarization beam combiners, and acousto-optic interaction regions. For example, the polarization beamsplitter and polarization beam combiner may be discrete planar devices, such as beam-splitting prisms, walk-off prisms and collimating lenses. The principles of operation of integrated and discrete AOTFs are similar.

In operation, a single-mode optical beam comprising, for example, three channels centered at optical wavelengths $\lambda_1$, $\lambda_2$, and $\lambda_3$ enters the polarization beamsplitter 12 through the first input 18. The polarization beamsplitter 12 separates the optical beam into TE and TM modes. The TE and TM modes propagate down separate waveguides 26 in the polarization mode-converter 14. Portions of the TE and TM modes are mode-converted by the polarization mode-converter 14. The TE and TM modes are then combined in the polarization beam combiner 16.

The mode-converter oscillator frequency is chosen to phase-match to one of the three optical channels. For example, the oscillator frequency can be chosen to phase-match to $\lambda_2$. In this configuration, the portions of the TE and TM modes centered at $\lambda_2$ are mode-converted to TM and TE, respectively, while portions centered at other wavelengths propagate down the waveguides without any polarization mode conversion. The TE mode couples straight through the polarization beam combiner 16 and the TM mode crosses over in the polarization beam combiner 16. Polarization splitters and combiners can also be designed to couple the TM mode straight through and the TE mode to cross-couple. In this configuration, the overall operation of the filter is the same.

The second output port 22 of the polarization beam combiner 16 produces the combined TE+TM components centered at the phase-matching wavelength $\lambda_2$, whereas the first output port 20 of the polarization beam combiner 16 produces the combined TE+TM components for all the other wavelengths. The AOTF 10 has essentially "dropped" the phase-matching wavelength selected by the oscillator frequency $f_a$ and passed through all other wavelengths. Therefore, the AOTF 10 performs the function of a tunable bandpass filter. The center frequency of the bandpass filter can be modified by changing the oscillator frequency $f_a$, and therefore, the phase-matching wavelength.

Thus the AOTF 10 can be configured as an add/drop multiplexer that drops one particular wavelength, and passes all other wavelengths. The signal propagating through the AOTF 10 has an empty spectral "slot" that corresponds to the spectral slot of the dropped signal. A new locally generated signal is then applied to a second input port 34 of the polarization beamsplitter 12. The AOTF 10 inserts this signal into the empty slot at $\lambda_2$ in the "through" output. This is done simultaneously with the "dropping" of the input channel centered at $\lambda_2$. Thus, the AOTF can be configured to simultaneously add and drop an optical signal.

The AOTF 10 can also be configured to add/drop multiple optical wavelengths. This is accomplished by using an oscillator signal that is a superposition of several sinusoids at different frequencies. The ability to add/drop multiple wavelengths is a unique characteristic of the AOTF and has application in WDM optical transport systems.

Known AOTFs have several practical limitations that make them difficult to implement in commercial optical transport systems. One such limitation is that it is difficult to construct a known AOTF that provides a narrow filter bandwidth (e.g., for 100 GHz channel spacing). Another limitation is that known AOTFs typically have poor out-of-band signal suppression. An additional limitation is that known AOTFs experience coherent "beating" between multiple drive frequencies when performing multi-wavelength add/drops. Yet another limitation is that known AOTFs have difficulty overcoming coherent beating related to the Doppler shift that is impressed on the phase-matching signal.

The bandwidth limitation can be substantially overcome or significantly reduced by increasing the interaction length of the AOTF. The interaction length, L, is the optical length in the mode-converter over which complete mode conversion occurs. The interaction length can be expressed as:

$$L = \frac{0.8\lambda^2}{\Delta\lambda \cdot \Delta n} \quad (2)$$

where $\lambda$ is wavelength, $\Delta\lambda$ is the full-width half-maximum (FWHM) bandwidth, and $\Delta n$ is the material birefringence.

The acoustic power density $I_a$ (watts/m$^2$) is related to the interaction length L by the following equation, assuming perfect phase matching:

$$I_a = \frac{\lambda^2}{2ML} \quad (3)$$

where M is the following figure of merit constant that is related to the material and propagation directions:

$$M = \frac{(n_{TE} n_{TM})^3 p^2}{\rho V_S^3} \quad (4)$$

The elasto-optic tensor component is represented by p, where p for lithium niobate is $P_{41}$. The material density is represented by $\rho$. An explicit relationship between acoustic power density $I_a$ and filter bandwidth $\Delta\lambda$ can be obtained by eliminating $\lambda^2$ in equations (2) and (3). The resulting equation for acoustic power density $I_a$ is:

$$I_a = \frac{\Delta\lambda \cdot \Delta n}{1.6M} \quad (5)$$

Thus, the bandwidth can be reduced (smaller $\Delta\lambda$) by increasing the interaction length L and lowering the acoustic power density $I_a$, as indicated by equations (2) and (5). To achieve the desired bandwidth and the desired acoustic power densities $I_a$ with known AOTF devices, the physical device lengths of these devices are impractically long for an optical device. For example, an AOTF formed of lithium niobate has a $\Delta n=0.072$ when the wavelength $\lambda$ is 1.55 $\mu$m. For a FWHM bandwidth of 0.4 nm (corresponding to the requirements of a system with 100 GHz channel spacing), the interaction length L is approximately 6.7 cm (about 2 ½ inches).

Such a device length is exceptionally long for an optical device, especially for a lithium niobate device. Lithium niobate substrates are typically 3" or 4" in diameter. Consequently, very few AOTF devices can be processed on a single substrate. Furthermore, lithium niobate is an extremely brittle material. The high aspect ratio and thin profile of a typical device (e.g. 6.7 cm long and approximately 0.3 cm wide and 0.5 to 1 mm thick) makes them particularly prone to breakage, especially during fabrication steps that require significant handling, such as dicing, edge polishing, and packaging.

Furthermore, the yield of such long devices would generally be unacceptably low because it is difficult to achieve the required uniformity over such long device lengths. The substrate and optical waveguides should be highly uniform over the entire length of the interaction region to insure that the only source of perturbation for the mode conversion is that due to the acoustic wave. Thus, in order to operate properly, the material properties of the substrate and the diffused waveguides themselves should not change within the interaction region, and the sides of the optical waveguide should be smooth. Achieving these requirements with known material growth and processing techniques is difficult over such exceptionally long device lengths.

For example, D. A. Smith, et al. in a paper entitled "Source of Sidelobe Asymmetry in Integrated Acousto-Optic Filters", Appl. Phys., v. 62, 8, 22, February 1993, pp. 814–816, indicated that for a specific AOTF with an interaction length of 2.0 cm, acceptable sidelobe levels could be obtained only if the titanium waveguide stripe width variation was less than 0.5 $\mu$m, the titanium thickness variation was less than 35 Å, and the diffusion temperature was held within about 9° C. It is currently very difficult to achieve these processing tolerances with a device that is 6.7 cm long.

Furthermore, it is relatively difficult and expensive to control the temperature to within the required temperature range with such exceptionally long devices. If the required temperature range is not achieved, the temperature offset from nominal will cause a shift in the wavelength to which the filter is phase matched. In addition, a temperature gradient along the device will result in asymmetric sidelobes and incomplete mode conversion, which can cause an unacceptable level of crosstalk as well as broaden the filter bandwidth.

One or more heaters or thermoelectric coolers can be used to control the temperature of the devices. However, heaters and coolers are power-intensive and expensive devices. A heater or cooler that is designed to maintain the temperature of a high aspect ratio and thin profile device would be particularly power-intensive and expensive. A suitably accurate heater or cooler controller may have to sense the temperature at several points along the length of the device, and have separate control loops for each sensor. Such a temperature control system can significantly add to the cost of deploying such a device.

Figure 2:
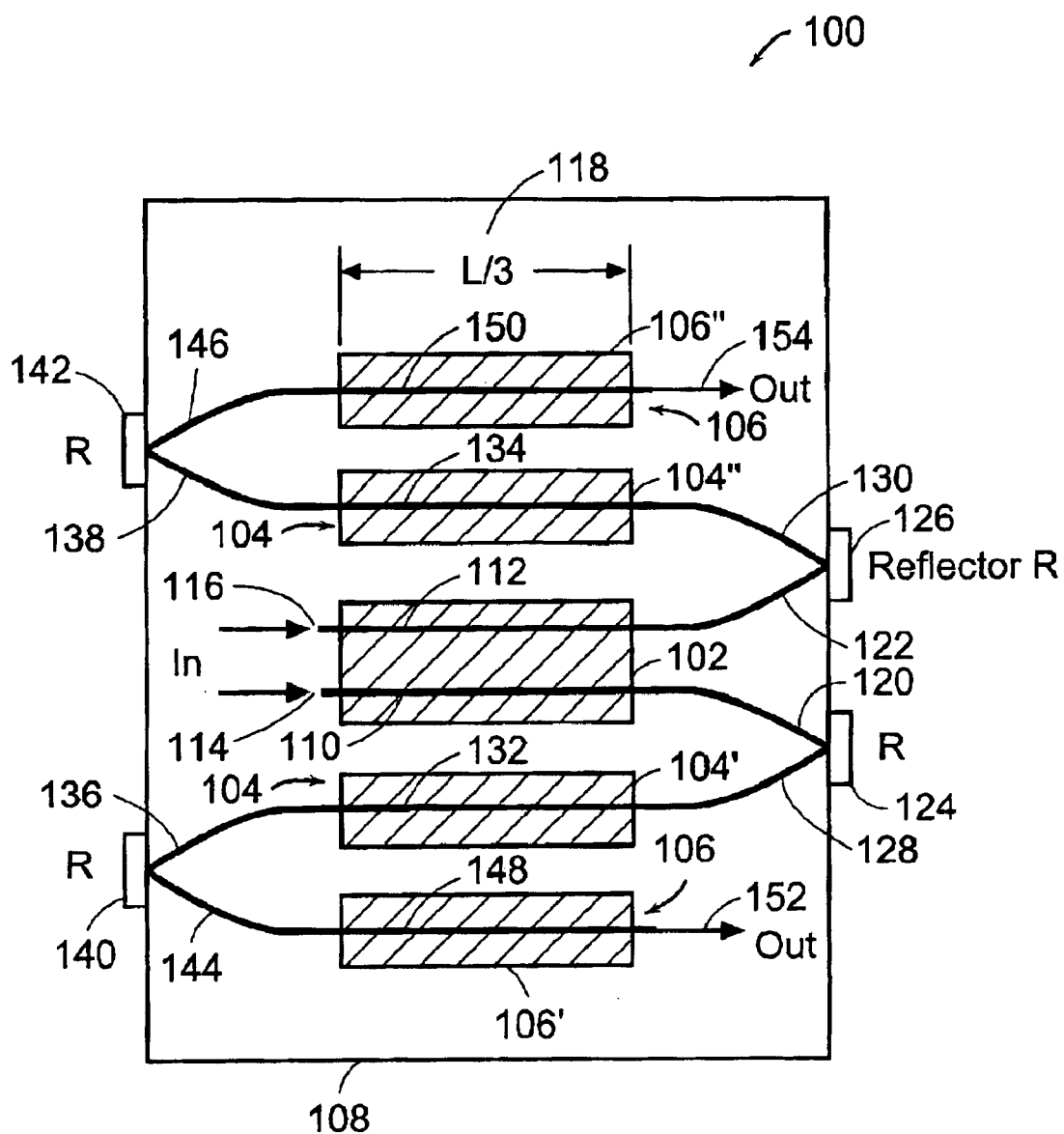
FIG. 2 illustrates one embodiment of a multi-segment interaction region of an acousto-optic tunable filter device according to the present invention that includes a three-segment folded interaction region positioned on a substrate having optical reflectors.

FIG. 2 illustrates an embodiment of a multi-segment interaction region of an AOTF device according to the present invention that includes a three-segment folded interaction region 100 positioned on a substrate having optical reflectors. FIG. 2 through FIG. 15 illustrates equal-length multi-segment interaction regions for the purpose of describing the invention. The present invention, however, is not limited to equal-length segments. The individual segments can be any length relative to the other segments including some equal and some non-equal lengths. Thus, each segment in FIG. 2 through FIG. 15 has a length L/N, where L is the combined interaction length of the plurality of segments and N is the number of segments.

The three-segment folded interaction region 100 includes a first 102, a second 104, and a third segment 106. The first segment 102 has a single interaction region. Each of the second 104 and the third segments 106 has a first 104', 106' and a second interaction region 104", 106", respectively. The three-segment folded interaction region 100 has a total combined length of each of the segments. Thus, if each of the three segments has a length of L/3, the total interaction length is L. The three-segment folded interaction region 100 is positioned on a substrate 108 that supports the three segments 102, 104, and 106 and optical elements used to optically couple the three segments 102, 104, and 106.

The first segment 102 includes a first 110 and a second optical waveguide 112 that are formed in the first segment material. The first 110 and the second optical waveguides 112 include a first 114 and a second optical input 116 that receive a first and a second optical signal, respectively. The first 110 and the second optical waveguides 112 extend through the length 118 of the first segment 102 and into the substrate 108. The first 110 and the second optical waveguides 112 have a first 120 and a second optical output 122 that is in optical communication with an incident surface of a first 124 and a second reflector 126, respectively. The first 124 and second reflectors 126 can be any type of reflectors, such as a dielectric stack, metallic mirror, or truncated waveguide coupler.

A first 128 and second input 130 of a third 132 and a fourth optical waveguide 134 are in optical communication with a reflecting surface of the first 124 and the second reflector 126, respectively. The third 132 and fourth optical waveguide 134 are positioned in the substrate 108 and extend the length of the first 104' and second section 104" of the second segment 104 and back into the substrate 108. The third 132 and fourth optical waveguides 134 have a first 136 and a second optical output 138 that is in optical communication with an incident surface of a third 140 and fourth reflector 142, respectively. The third 140 and fourth reflectors 142 can be any type of reflectors, such as a dielectric stack, metallic mirror, or truncated waveguide coupler.

A first 144 and second input 146 of a fifth 148 and a sixth optical waveguide 150 are in optical communication with a reflecting surface of the third 140 and fourth reflectors 142, respectively. The fifth 148 and sixth optical waveguides 150 are positioned in the substrate 108 and extend through the length of the first 106' and second sections 106" of the third segment 106. The fifth 148 and the sixth optical waveguides 150 have a first 152 and a second optical output 154.

Each of the first 102, second 104, and third segments 106 includes a separate acoustic wave generator section (not shown) that includes inter-digitated fingers and acoustic absorbers as described herein. In one embodiment, the acoustic wave generator section also includes acoustic waveguides. The acoustic drive signals applied to the each of the separate acoustic wave generator sections have a phase that is chosen so that the mode conversion is coherent with the other sections.

In operation, the first 114 and the second optical input 116 of the first 110 and the second optical waveguides 112 receive a first and a second optical signal, respectively. Each of the first and the second optical signals include a plurality of wavelengths. The first and the second optical signals propagate through and the first 110 and the second optical waveguides 112. An acoustic signal having a frequency $f_a$ is applied to the acoustic wave generator section of the first interaction region 102 causing at least partial mode conversion of the first and second optical signals that have a wavelength $\lambda_0$. Thus, the first and the second optical signals that have wavelength $\lambda_0$ are substantially phase-matched to the acoustic signal in the first segment 102. The first and the second optical signals having wavelengths other than the wavelength $\lambda_0$ do not satisfy the phase matching criterion and thus pass through the first interaction region 102 without undergoing mode conversion.

The first and second optical signals that are partially mode-converted in the first segment 102 are reflected by the first 124 and the second reflector 126 into the third 132 and fourth optical waveguides 134, respectively. An acoustic signal having a frequency $f_a$ is applied to the acoustic wave generator section of the first 104' and second segments 104" of the second interaction region 104. This causes additional mode conversion of the partially mode-converted first and second optical signals that have wavelength $\lambda_0$ in the second segment 104. The first and second optical signals having wavelengths other than $\lambda_0$ do not satisfy the phase matching criterion and, thus, pass through the second interaction region 104 without undergoing mode conversion.

The first and second optical signals that are additionally mode-converted in the second segment 104 are reflected by the third 140 and fourth 142 reflectors into the fifth 148 and sixth optical waveguides 150, respectively. An acoustic signal having a frequency $f_a$ is applied to the acoustic wave generator section of the first 106' and second segments 106" of the third interaction region 106. This causes final mode conversion of the additionally mode-converted first and second optical signals each having wavelength $\lambda_0$ in the third interaction region 106. Thus, the three interaction regions 102, 104, and 106 together behave like a single interaction region having a length that enables the desired degree of mode conversion. The first and second optical signals having wavelengths other than the wavelength $\lambda_0$ do not satisfy the phase matching criterion and thus pass through the third interaction region 106 without undergoing mode conversion.

An AOTF including the three-segment folded interaction region 100 of FIG. 2 is a single AOTF that has an effective optical path length that is equal to the optical path length of the sum of the optical path lengths of the individual segments. This is in contrast to prior art cascaded AOTF devices that use reflectors to combine several complete filters at the input or the output of each filter. Each of the cascaded AOTFs in these prior art devices requires a polarization beamsplitter and combiner in addition to an acousto-optic interaction region.

An AOTF including the three-segment folded interaction region 100 of FIG. 2 is advantageous because it can achieve a relatively long effective interaction length L, and thus, a relatively narrow bandwidth, without a having physically long interaction length and thus a high aspect ratio and thin profile. Thus, an AOTF including the three-segment folded interaction region 100 of FIG. 2 can have a relatively narrow bandwidth and exhibit good mechanical properties and environmental stability in commercial operating environments.

Figure 3:
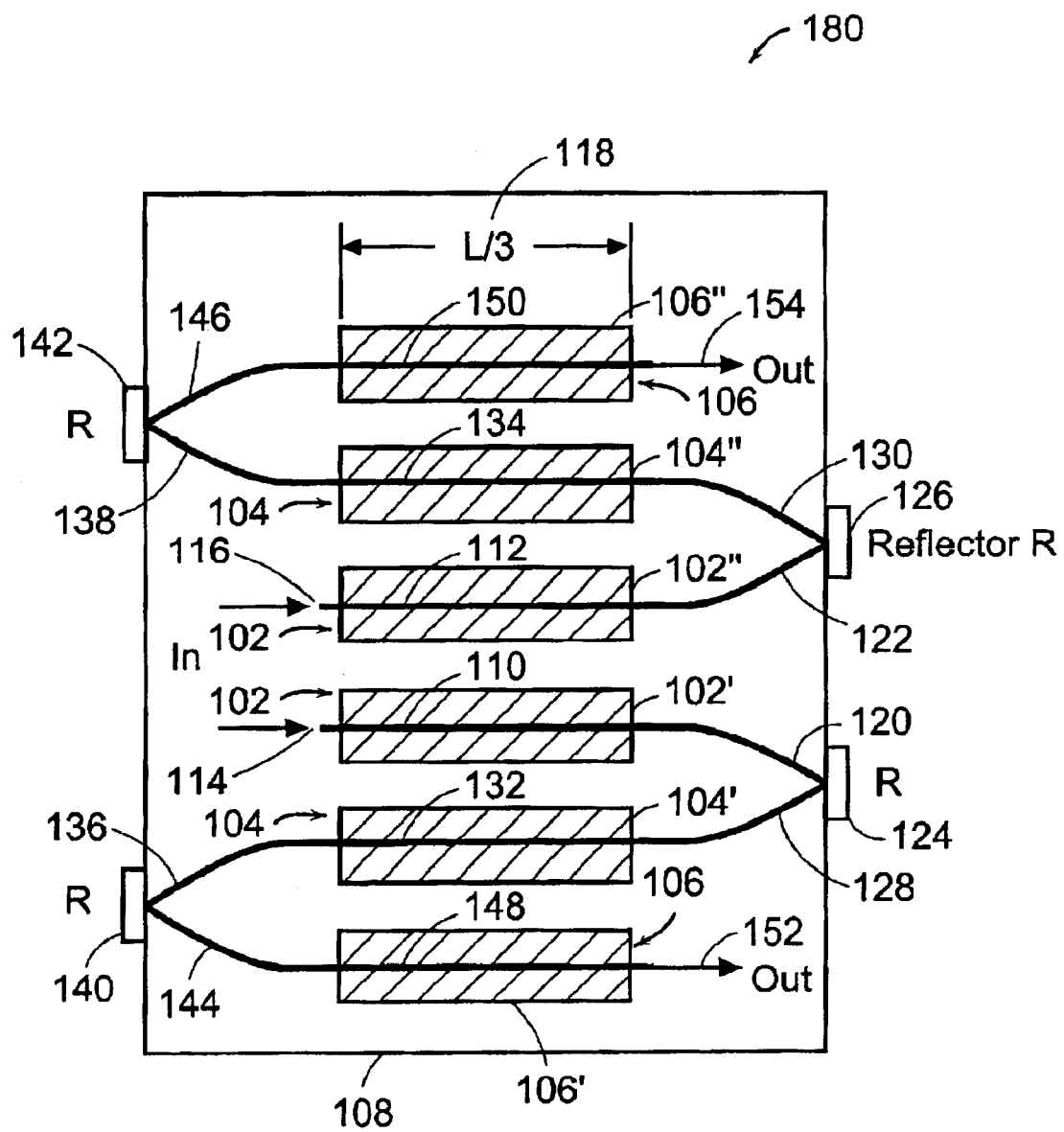
FIG. 3 illustrates another embodiment of a multi-segment interaction region of an acousto-optic tunable filter device according to the present invention that includes a three-segment folded interaction region positioned on a substrate having optical reflectors.

There are numerous embodiments of a multi-segment interaction region that include folded interaction regions according to the present invention. FIG. 3 illustrates another embodiment of a multi-segment interaction region 180 of an AOTF device according to the present invention that includes a three-segment folded interaction region positioned on a substrate having optical reflectors. The multi-segment interaction region 180 of FIG. 3 is similar to the three-segment folded interaction region 100 that was described in connection with FIG. 2. The first segment, however, has a first 102' and a second interaction region 102" instead of the single interaction region 102.

Figure 4:
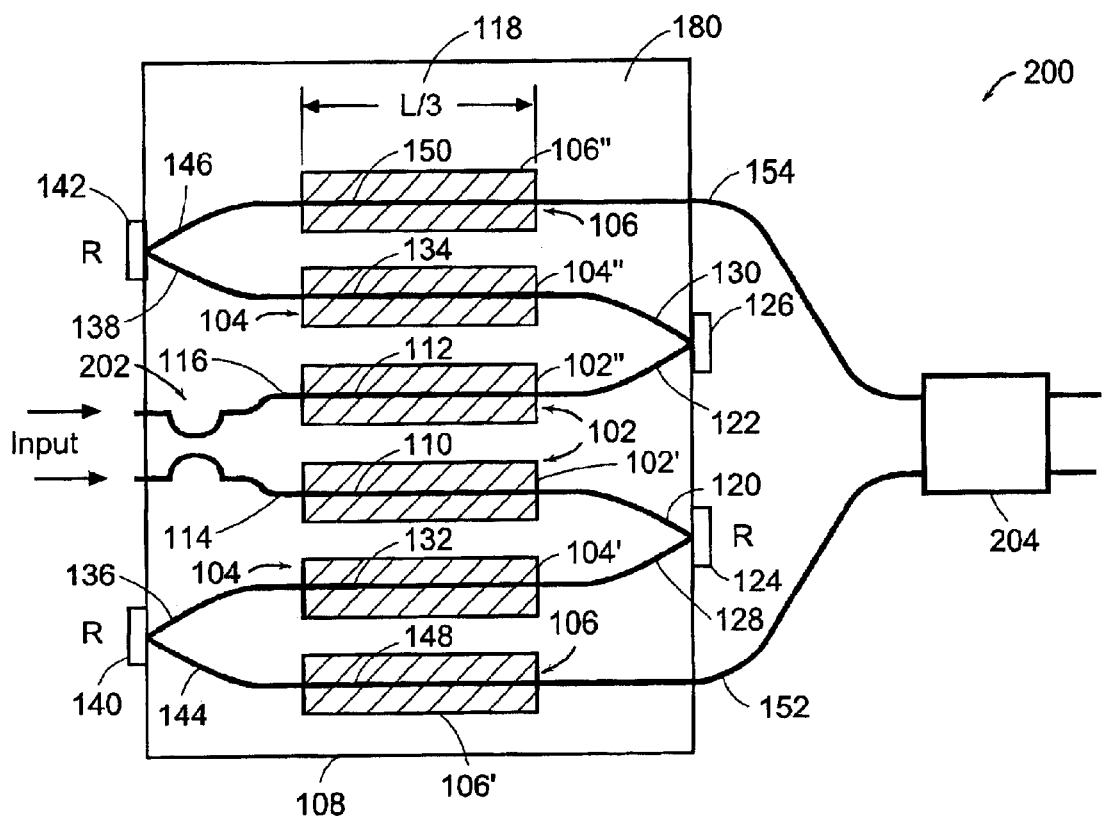
FIG. 4 illustrates an embodiment of a complete acousto-optic tunable filter that includes the multi-segment interaction region of FIG. 3.

The three-segment folded interaction region 100 of FIG. 3 can be configured as an AOTF in numerous ways. FIG. 4 illustrates an embodiment of a complete AOTF 200 that includes the three-segment folded interaction region 180 of FIG. 3. The AOTF 200 includes a polarization beamsplitter 202 that is optically coupled to the first 114 and the second optical input 116. The AOTF 200 also includes a polarization beam combiner 204 that is optically coupled to the first 152 and the second optical output 154.

In one embodiment, the polarization beamsplitter 202 and the polarization beam combiner 204 are integrated directly on the substrate 108. In other embodiment, the polarization beamsplitter 202 and the polarization beam combiner 204 are discrete planar devices that are optically connected to the three-segment folded interaction region 180 with optical fibers, lenses, or free space optically coupling.

Integrating the polarization beamsplitter 202 on the substrate 108 is relatively easy. However, it can be relatively difficult to integrate the polarization beam combiner 204 on the substrate 108 because the first 152 and the second optical outputs 154 are physically separated by a relatively large distance, due to the three-segment folded interaction region geometry. Therefore, in one embodiment of the invention, the polarization beamsplitter 202 is integrated onto the substrate 108 and the polarization beam combiner 204 is an external discrete planar device as illustrated in FIG. 4.

Figure 5:
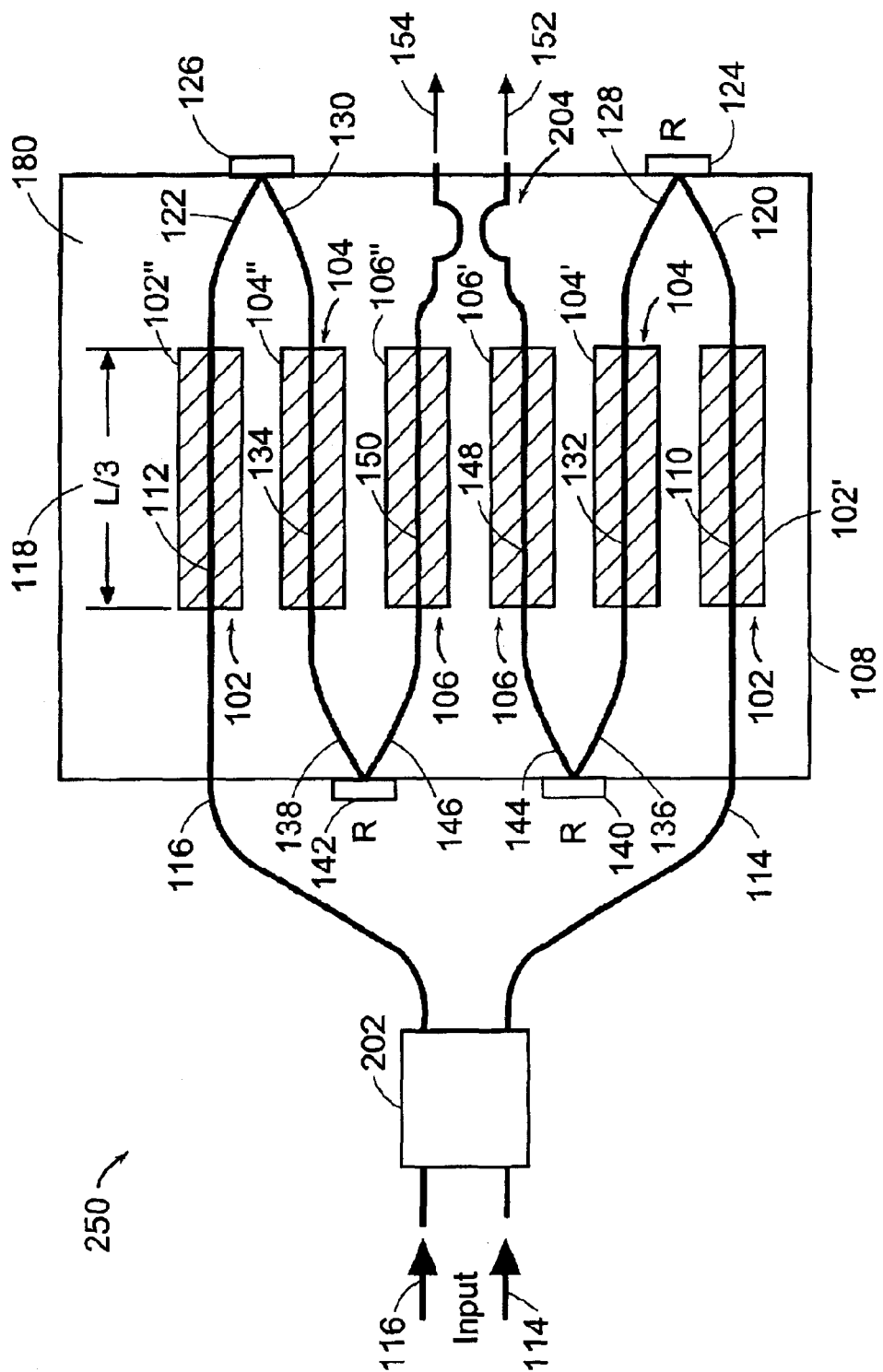
FIG. 5 illustrates another embodiment of a complete acousto-optic tunable filter that includes the multi-segment interaction region of FIG. 3.

FIG. 5 illustrates another embodiment of a complete AOTF 250 that includes the multi-segment interaction region 180 of FIG. 3. In this embodiment, the inputs and outputs of the AOTF 250 are interchangeable relative to the AOTF 200 of FIG. 4. The inputs and outputs of the AOTF 250 can be interchanged because the multi-segment interaction region 180 is symmetrical.

In this embodiment, it is relatively easy to integrate the polarization beam combiner 204 on the substrate 108. However, it is relatively difficult to integrate the polarization beamsplitter 202 on the substrate 108 because the first 114 and the second optical input 116 are physically separated by a relatively large distance, due to the three-segment folded interaction region geometry. Therefore, in one embodiment of the invention, the polarization beamsplitter 204 is integrated onto the substrate 108 and the polarization beamsplitter 202 is an external discrete planar device as illustrated in FIG. 5.

Figure 6:
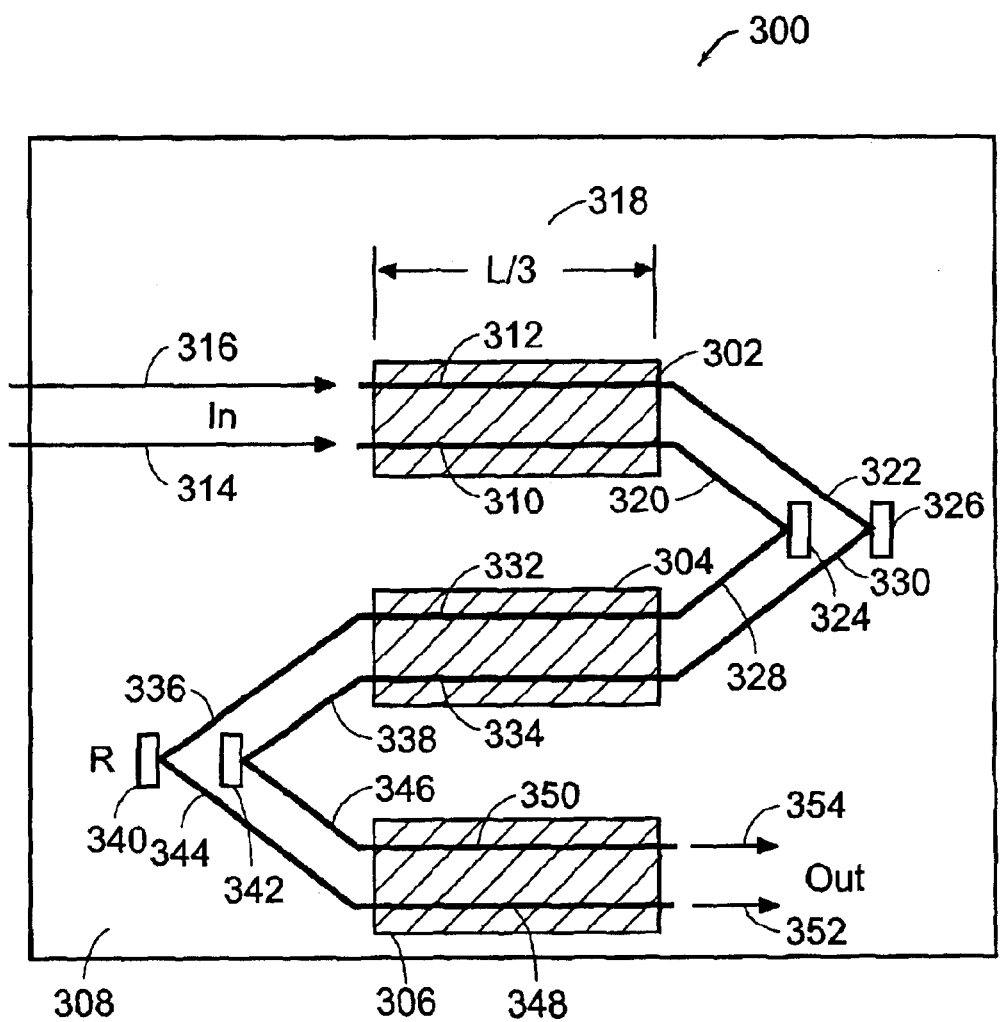
FIG. 6 illustrates an embodiment of a multi-segment interaction region of an acousto-optic tunable filter device according to the present invention that includes a three-segment folded interaction region where each segment includes two optical waveguides, and where the folding is accomplished with reflectors.

FIG. 6 illustrates an embodiment of a multi-segment interaction region of an AOTF device according to the present invention that includes a three-segment folded interaction region 300 where each segment includes two optical waveguides. The three-segment folded interaction region 300 includes a first 302, a second 304, and a third interaction region 306. Each of the three segments has a length of L/3. Thus, the total interaction length is L. The three-segment folded interaction region 300 is positioned on a substrate 308 that supports the three segments 302, 304, and 304, and optical elements used to optically couple the three segments 302, 304, and 304.

The first segment 302 includes first 310 and second optical waveguides 312 that are formed in the first segment material. The first 310 and the second optical waveguides 312 include a first 314 and a second optical input 316 that receive a first and a second optical signal, respectively. The first 310 and the second optical waveguides 312 extend through the length 318 of the first segment 302 and into the substrate 308. The first 310 and the second optical waveguides 312 have a first 320 and a second optical output 322 that are in optical communication with an incident surface of a first 324 and a second reflector 326, respectively. The first 324 and second reflectors 326 can be any type of reflectors, such as a dielectric stack, metallic mirror, or truncated waveguide coupler.

A first 328 and a second input 330 of a third 332 and a fourth optical waveguide 334 are in optical communication with a reflecting surface of the first 324 and the second reflector 326, respectively. The third 332 and fourth optical waveguides 334 are positioned in the substrate 308 and extend the length 318 of the second segment 304 and then into the substrate 308. The third 332 and fourth optical waveguides 334 have a first 336 and a second optical output 338 that are in optical communication with an incident surface of a third 340 and fourth reflector 342, respectively. The third 340 and fourth reflectors 342 can be any type of reflectors, such as a dielectric stack, metallic mirror, or truncated waveguide coupler.

A first 344 and second input 346 of a fifth 348 and a sixth optical waveguide 350 are in optical communication with a reflecting surface of the third 340 and fourth reflector 342, respectively. The fifth 348 and sixth optical waveguides 350 are positioned in the substrate 308 and extend through the length 318 of the third segment 306. The fifth 348 and the sixth optical waveguides 350 have a first 352 and a second optical output 354, respectively.

Each of the first 302, second 304, and third segments 306 include a separate acoustic wave generator section (not shown) that includes inter-digitated fingers and acoustic absorbers as described herein. In one embodiment, the acoustic wave generator section also includes acoustic waveguides. The acoustic drive signals applied to each of the separate acoustic wave generator sections have a phase that is chosen such that the mode conversion is coherent with the other sections.

The operation of an AOTF device using the three-segment folded interaction region 300 of FIG. 6 is similar to the operation of an AOTF device using the three-segment folded interaction region 100 of FIG. 2. The first 314 and the second optical inputs 316 of the first 310 and the second optical waveguides 312 receive a first and a second optical signal, respectively. Each of the first and the second optical signals include a plurality of wavelengths. The first and the second optical signals propagate through the first 310 and the second optical waveguides 312, respectively. An acoustic signal is applied to the acoustic wave generator section of the first interaction region 302 causing partial mode conversion of the first and second optical signals that satisfy the phase-matching criterion. The first and second optical signals that do not satisfy the phase-matching criterion do not undergo partial mode conversion in the first segment 302.

The first and second optical signals that are mode-converted in the first segment 302 propagate down the first 310 and the second optical waveguide 312 and are reflected by the first 324 and the second reflector 326 into the third 332 and fourth optical waveguide 334, respectively. An acoustic signal is applied to the acoustic wave generator section of the second interaction region 304 causing additional mode conversion of the first and second optical signals that satisfy the phase-matching criterion. The first and second optical signals that do not satisfy the phase-matching criterion do not undergo mode conversion in the second segment 304.

The first and second optical signals that are additionally mode-converted in the second segment 304 propagate down the third 332 and the fourth optical waveguides 334 and are reflected by the third 340 and fourth 342 reflectors into the fifth 348 and sixth optical waveguides 350, respectively. An acoustic signal is applied to the acoustic wave generator section of the third interaction region 306 causing final mode conversion of the first and second optical signals that satisfy the phase-matching criterion. The first and second optical signals that do not satisfy the phase-matching criterion do not undergo mode conversion in the third interaction region 306.

An AOTF including the three-segment folded interaction region 300 of FIG. 6 is a single AOTF that has an effective optical path length that is equal to the optical path length of the sum of the optical path lengths of the individual segments. Therefore, the AOTF including the three-segment folded interaction region 300 of FIG. 6 is advantageous because it can achieve a relatively long effective interaction length L, and thus, a relatively narrow bandwidth, without a using physically long interaction length and thus a high aspect ratio and thin profile.

An AOTF including the three-segment folded interaction region 300 of FIG. 6 is also advantageous because it facilitates relatively simple integration of a polarization beamsplitter and a polarization beam combiner on the substrate 308. In addition, it is relatively simple to make the total path lengths of the two waveguides the same. This is because the geometry of the waveguides can be chosen so that a relatively short length of waveguide connecting one segment can be matched with a relatively long length of waveguide connecting the next segment as shown in FIG. 6.

Figure 7:
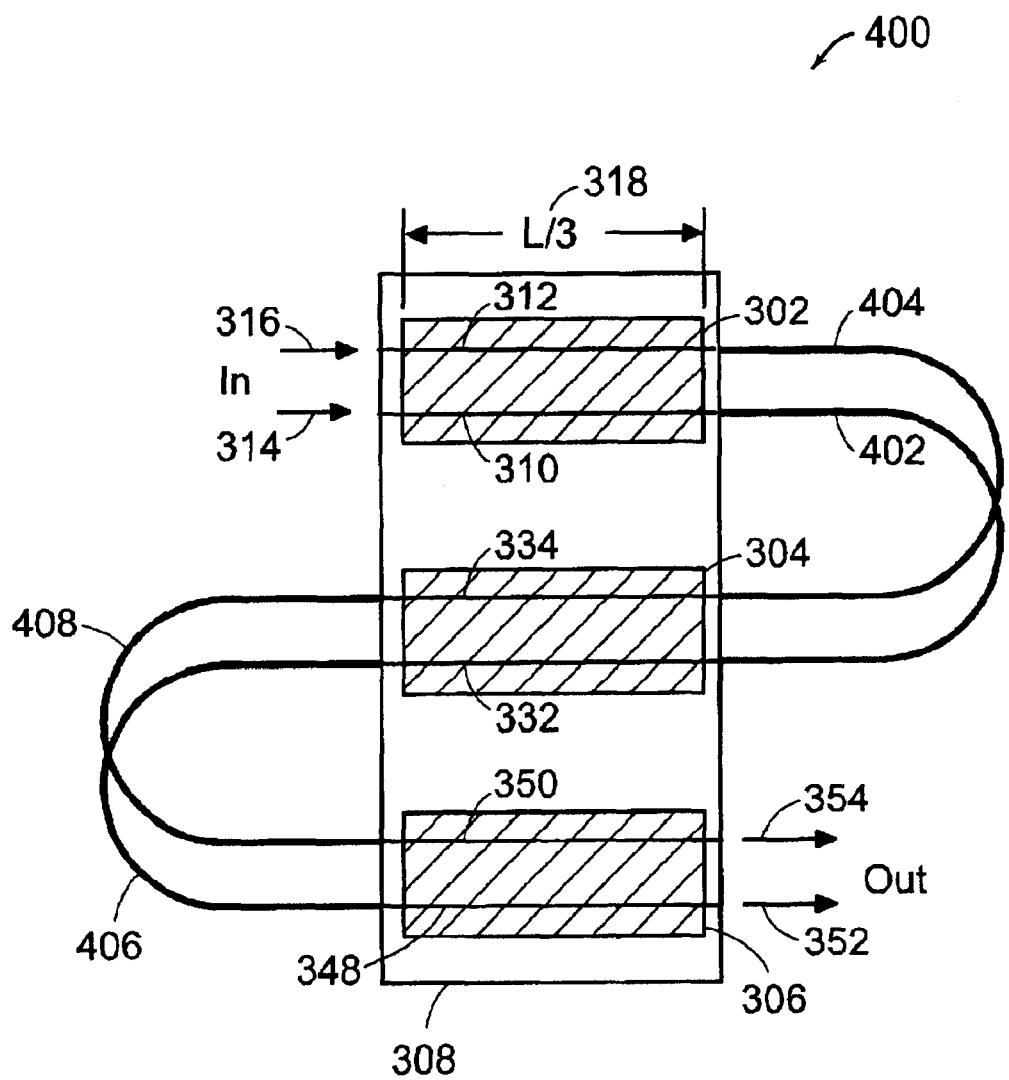
FIG. 7 illustrates an embodiment of a multi-segment interaction region of an acousto-optic tunable filter device according to the present invention that includes a three-segment folded interaction region where each segment includes two optical waveguides, and where the folding is accomplished with optical fiber loops.

FIG. 7 illustrates another embodiment of a multi-segment interaction region of an acousto-optic tunable filter device according to the present invention that includes a three-segment folded interaction region 400 where each segment includes two optical waveguides. The three-segment folded interaction region 400 is similar to the three-segment folded interaction region 300 of FIG. 6.

However, the first 310 and second optical waveguides 312 of the first 302 segment are optically coupled to the third 332 and the fourth 334 optical waveguides of the second segment 304 with first 402 and second optical fibers 404, respectively. Similarly, the third 332 and the fourth 334 optical waveguides of the second segment 304 are optically coupled to the fifth 348 and sixth optical waveguides 350 with a third 406 and a fourth optical fiber 408, respectively.

The three-segment folded interaction region 400 of FIG. 7 is advantageous because it does not require reflectors that can be complex to integrate into a signal substrate. Also, it is relatively easy to cut and polish optical fibers to substantially equal lengths and, therefore, it is relatively easy to make the optical path lengths of the first and second optical fibers substantially equal.

Figure 8:
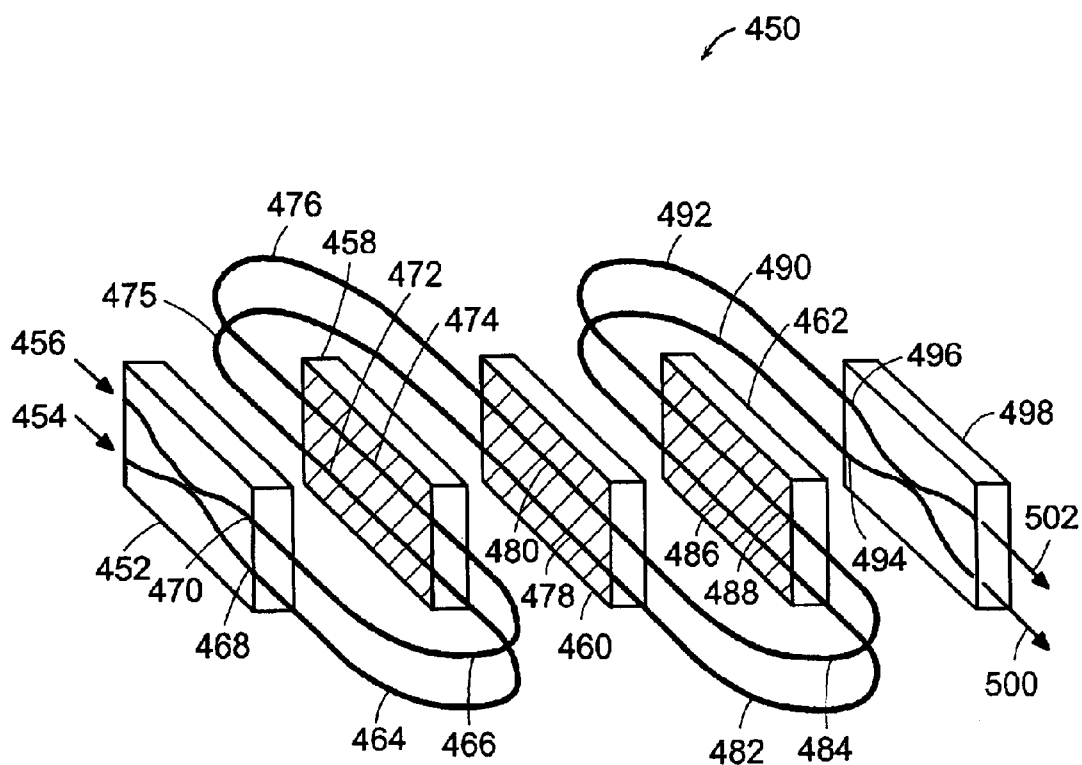
FIG. 8 illustrates an acousto-optic tunable filter device according to the present invention that includes three discrete segments that are optically coupled together with optical fibers.

FIG. 8 illustrates an embodiment of an AOTF device 450 according to the present invention that includes three discrete segments that are optically coupled together with optical fibers. The AOTF device 450 includes a discrete polarization beamsplitter 452 that includes first 454 and second inputs 456 that receive first and second optical signals, respectively. The AOTF device 450 also includes a first 458, a second 460 and a third discrete interaction region 462.

A first 464 and a second optical fiber 466 optically couple a first 468 and a second output 470 of the polarization beamsplitter 452 to a first 472 and a second waveguide 474, respectively, in the first interaction region 458. A third 475 and a fourth optical fiber 476 optically couple the first 472 and the second waveguide 474 in the first interaction region 458 to a third 478 and a fourth optical waveguide 480, respectively, in the second interaction region 460.

Similarly a fifth 482 and a sixth optical fiber 484 optically couple the third 478 and the fourth optical waveguide 480 in the second interaction region 460 to a fifth 486 and a sixth optical waveguide 488, respectively, in the third interaction region 462. A seventh 490 and eight optical fiber 492 optically couple the fifth 486 and a sixth optical waveguide 488, respectively, in the third interaction region 462 to a first 494 and a second input 496 of a polarization beam combiner 498, respectively. One of a first 500 and a second output 502 of the polarization beam combiner 498 generates a substantially mode-converted optical signal and the other of the first 500 and the second output 502 generates a non-mode-converted optical signal.

Each of the first 458, second 460 and third discrete interaction region 462 includes a separate acoustic wave generator section (not shown). In alternate embodiments, the separate acoustic wave generator sections can include interdigitated fingers, acoustic absorbers, and may include acoustic waveguides as described herein. The acoustic drive signals applied to the each of the separate acoustic wave generator sections have a phase that is chosen so that the mode conversion is coherent with the other sections.

In one embodiment, the lengths of the optical fibers are substantially equal. Constructing a multi-segment folded interaction region with discrete segments as shown in FIG. 8 is advantageous because it allows each separate interaction segment to be tested before assembly, which increases device yield.

Figure 9:
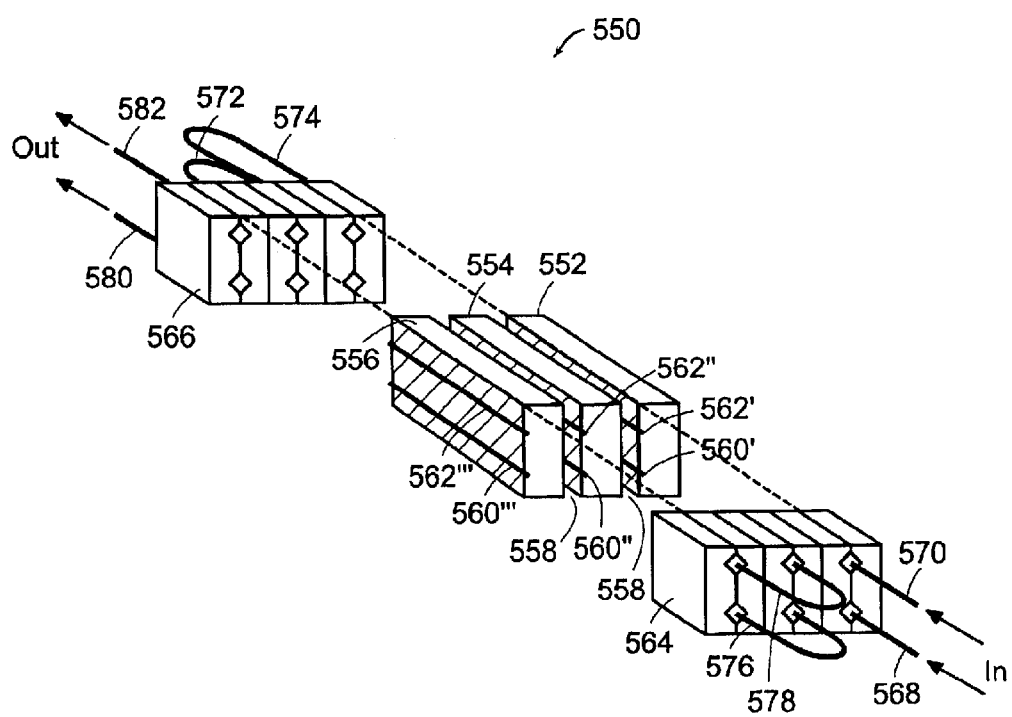
FIG. 9 illustrates an exploded view of an embodiment of a multi-segment interaction region for an acousto-optic tunable filter device according to the present invention that includes three discrete interaction regions that are optically coupled together with optical fibers that are aligned with V-groove blocks.

There are numerous other AOTF geometries according to the present invention that use discrete interaction regions. For example, FIG. 9 illustrates an exploded view of one embodiment of a multi-segment interaction region 550 for an AOTF device according to the present invention that includes three discrete interaction regions that are optically coupled together with optical fibers that are aligned with V-groove blocks. A first 552, second 554, and third interaction region 556 are stacked with a small gap 558 between the first 552 and second interaction region 554 and a small gap 558 between the second 554 and third interaction region 556. Each of the first 552, second 554, and third interaction regions 556 includes a first 560', 560", 560'" and a second optical waveguide 562', 562", 562'", respectively, as described herein.

The gap 558 is chosen to be wide enough so that there is substantially no interaction between surface acoustic waves in different interaction regions. For example, the gap 558 is chosen so that there is no interaction between the surface acoustic waves in the first interaction region 552 and the surface acoustic waves in the second 554 and in the third interaction regions 556.

A first 564 and a second V-groove optical fiber alignment block 566 is used to position optical fibers in optical communication with the first 560', 560", 560'" and the second optical waveguides 562', 562", 562'" of the first 552, second 554, and third interaction regions 556. The first V-groove block 564 positions a first 568 and a second input optical fiber 570 in optical communication with the first 560' and the second optical waveguides 562', respectively, of the first interaction region 552.

The second V-groove block 566 positions a third 572 and a fourth optical fiber 574 in optical communication with an output of the first 560' and the second optical waveguides 562', respectively, of the first interaction region 552 and an input of the first 560" and the second optical waveguides 562", respectively, of the second interaction region 554. Similarly, the first V-groove block 564 positions a fifth 576 and a sixth optical fiber 578 in optical communication with an output of the first 560" and the second optical waveguides 562", respectively, of the second interaction region 554 and an input of the first 560'" and the second optical waveguides 562'", respectively, of the third interaction region 556. The second V-groove block 566 positions a seventh 580 and an eighth output optical fiber 582 in optical communication with the first 560'" and the second optical waveguides 562'", respectively, of the third interaction region 556.

Figure 10:
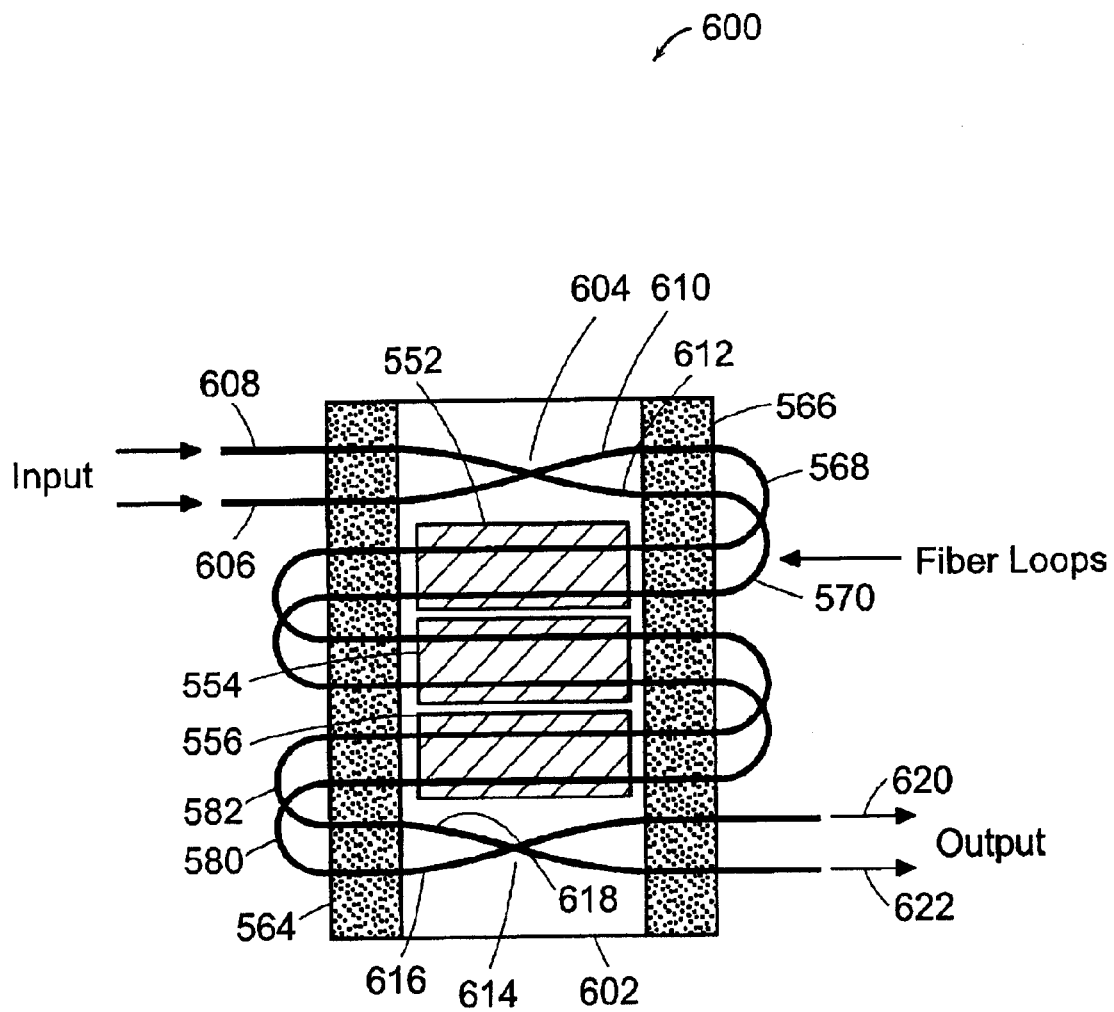
FIG. 10 illustrates a top view of a planar embodiment of an acousto-optic tunable filter device according to the present invention that includes the multi-segment interaction region on a single substrate with the interconnections accomplished by means of V-groove arrays of fiber loops.

FIG. 10 illustrates a top view of a planar embodiment of an AOTF device 600 according to the present invention that includes a multi-segment interaction region. The first 552, the second 554, and the third interaction regions 556 are optically coupled together with optical fibers that are aligned with V-groove blocks as described in connection with FIG. 9.

The AOTF device 600 includes a substrate 602 that supports the first 552, the second 554, and the third interaction regions 556. The interaction regions 552, 554, and 556 can be integrated interaction regions or can be discrete interaction regions that are bonded to the substrate 602. A polarization beamsplitter 604 is positioned on the substrate 602. The polarization beamsplitter 604 includes a first 606 and a second optical input 608 that receives a first and a second optical signal, respectively. A first 610 and a second output 612 of the polarization beamsplitter 604 is optically coupled to the first 568 and the second input optical fiber 570.

A polarization beam combiner 614 is positioned on the substrate 602. A first 616 and second input 618 of the polarization beam combiner 614 are optically coupled to the seventh 580 and the eighth output optical fibers 582, respectively, of the third interaction region 556. One of a first 620 and a second output 622 of the polarization beam combiner 614 generates a substantially mode-converted optical signal and the other of the first 620 and the second output 622 generates a non-mode-converted optical signal.

Figure 11:
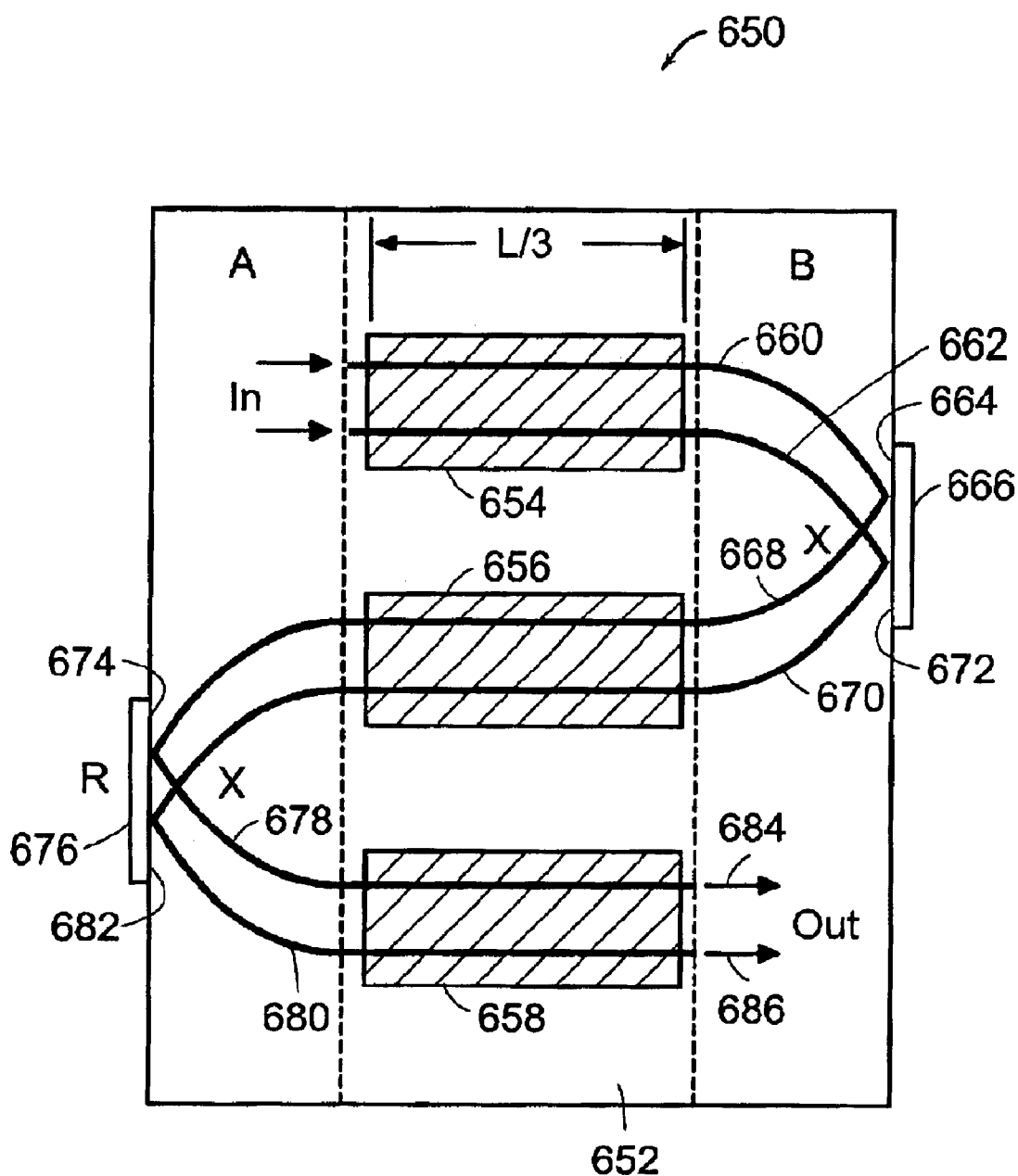
FIG. 11 illustrates an embodiment of a multi-segment interaction region for an acousto-optic tunable filter device according to the present invention that includes crossed waveguides and edge reflectors.

FIG. 11 illustrates an embodiment of a multi-segment interaction region 650 for an AOTF device according to the present invention that includes crossed waveguides. The multi-segment interaction region 650 is similar to the three-segment folded interaction regions described herein. However, the interaction regions are optically coupled by crossed optical waveguides instead of optical fibers.

The multi-segment interaction region 650 includes a substrate 652 that supports a first 654, a second 656, and a third interaction region 658. The first interaction region 654 includes a first 660 and a second optical waveguide 662 that extends through the first interaction region 654 to an incident surface 664 of a first reflector 666. A third 668 and a fourth optical waveguide 670 is positioned in optical communication with a reflection surface 672 of the first reflector 666. The third 668 and the fourth optical waveguide 670 extend into the second interaction region 656 to an incident surface 674 of a second reflector 676.

Similarly, a fifth 678 and a sixth optical waveguide 680 are positioned in optical communication with a reflecting surface 682 of the second reflector 676. The fifth 678 and a sixth optical waveguide 680 extend through the third interaction region 658 to a first 684 and a second output 686, respectively.

In one embodiment, the waveguides are crossed at a sufficiently large angle in order to minimize undesirable coupling between the crossing waveguides. In alternative embodiments, the waveguides are ridge waveguides, channel waveguides, or other structures that have a relatively high refractive index difference between the waveguide material and the cladding material in order to minimize the undesirable coupling.

In one embodiment, at least one of the first 666 and the second reflector 676 is positioned on a substrate that is different from the substrate 652 that supports the first 654, the second 656, and the third interaction regions 658. The different substrates can be chosen to minimize optical losses, birefringence, and mode conversion, while still having relatively large angles. For example, the different substrates can be chosen to accommodate transition tapers that have a mode size that is different than the mode size in the substrate 652. In one embodiment, the different substrate materials are bonded to the substrate 652. In other embodiments, the different substrates abut the substrate 652.

Figure 12:
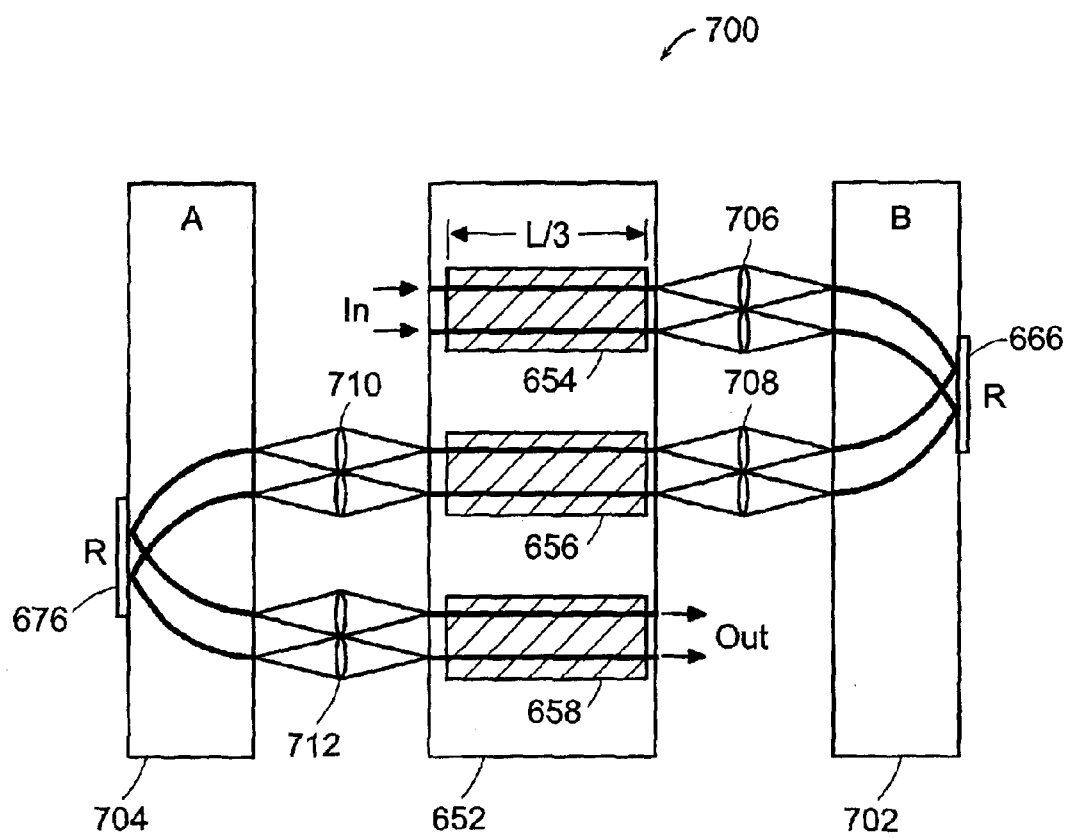
FIG. 12 illustrates an embodiment of a multi-segment interaction region according to the present invention that includes lens arrays that optically couple the interaction regions.

FIG. 12 illustrates an embodiment of the multi-segment interaction region 700 according to the present invention that includes lens arrays that optically couple the interaction regions. The multi-segment interaction region 700 is similar to the multi-segment interaction region 650 of FIG. 11. However, the first reflector 666 is positioned on a first separate substrate 702 and the second reflector 676 is positioned on a second separate substrate 704.

A first lens array 706 optically couples the first interaction region 654 to the first reflector 666. A second lens array 708 optically couples the first reflector 666 to the second interaction region 656. Similarly, a third lens array 710 optically couples the second interaction region 656 to the second reflector 676. A fourth lens array 712 optically couples the second reflector 676 to the third interaction region 658. In another embodiment, single lenses can be used instead of the lens arrays.

In one embodiment, the image and the object plane of the lenses in the lens arrays 706, 708, 710, and 712 are chosen to accommodate different mode sizes between at least one of the first 702 and the second separate substrate 704 and the substrate 652 that supports the interaction regions.

Figure 13:
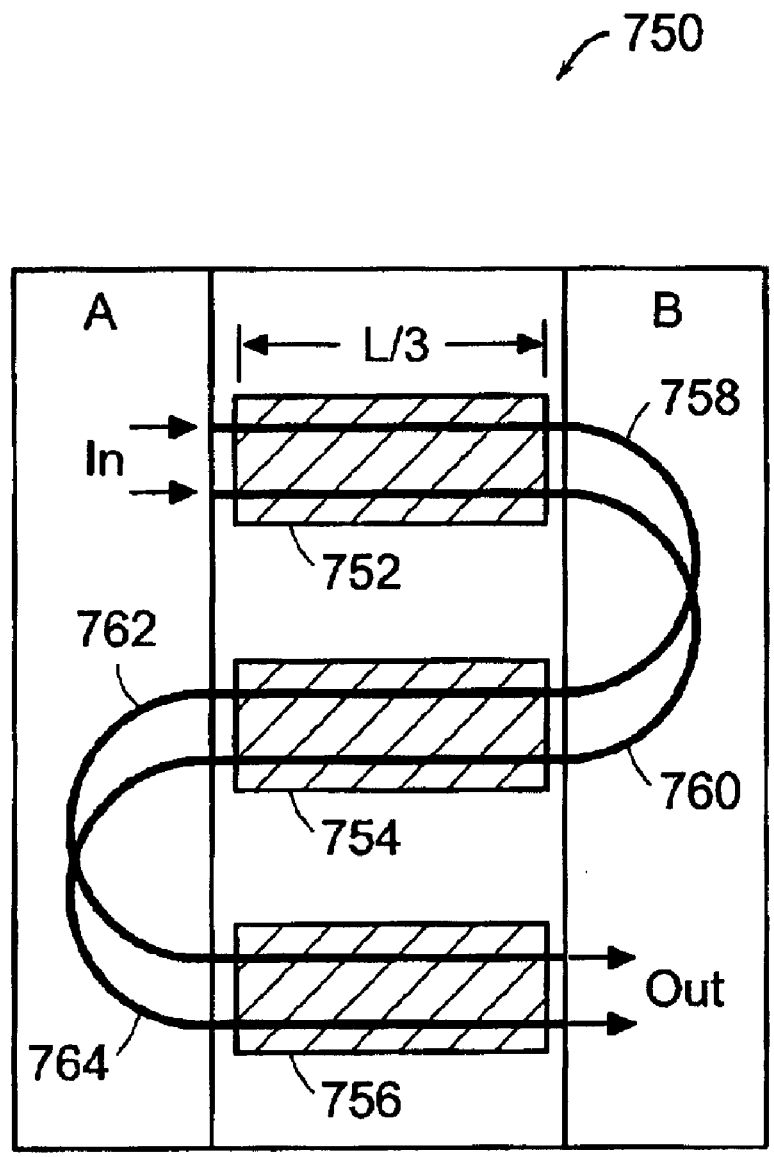
FIG. 13 illustrates an embodiment of the multi-segment interaction region according to the present invention where the segments are connected by means of crossed waveguide turns.

FIG. 13 illustrates an embodiment of the multi-segment interaction region 750 according to the present invention that uses semicircular waveguides to optically couple the interaction regions. The multi-segment interaction region 750 includes a first 752, a second 754, and a third interaction region 756. A first 758 and a second semicircular waveguide 760 optically couples the first interaction region 752 to the second interaction region 754. Similarly, a third 762 and a fourth semicircular waveguide 764 optically couples the second interaction region 754 to the third interaction region 756.

The geometry of the semicircular waveguides is chosen to minimize radiation loss. The semicircular waveguides are advantageous because they eliminate the necessity of using reflectors to couple the interaction regions. In the embodiment, shown in FIG. 13, the first 758 and the second semicircular waveguides 760 and the third 762 and the fourth semicircular waveguides 764 cross.

Figure 14:
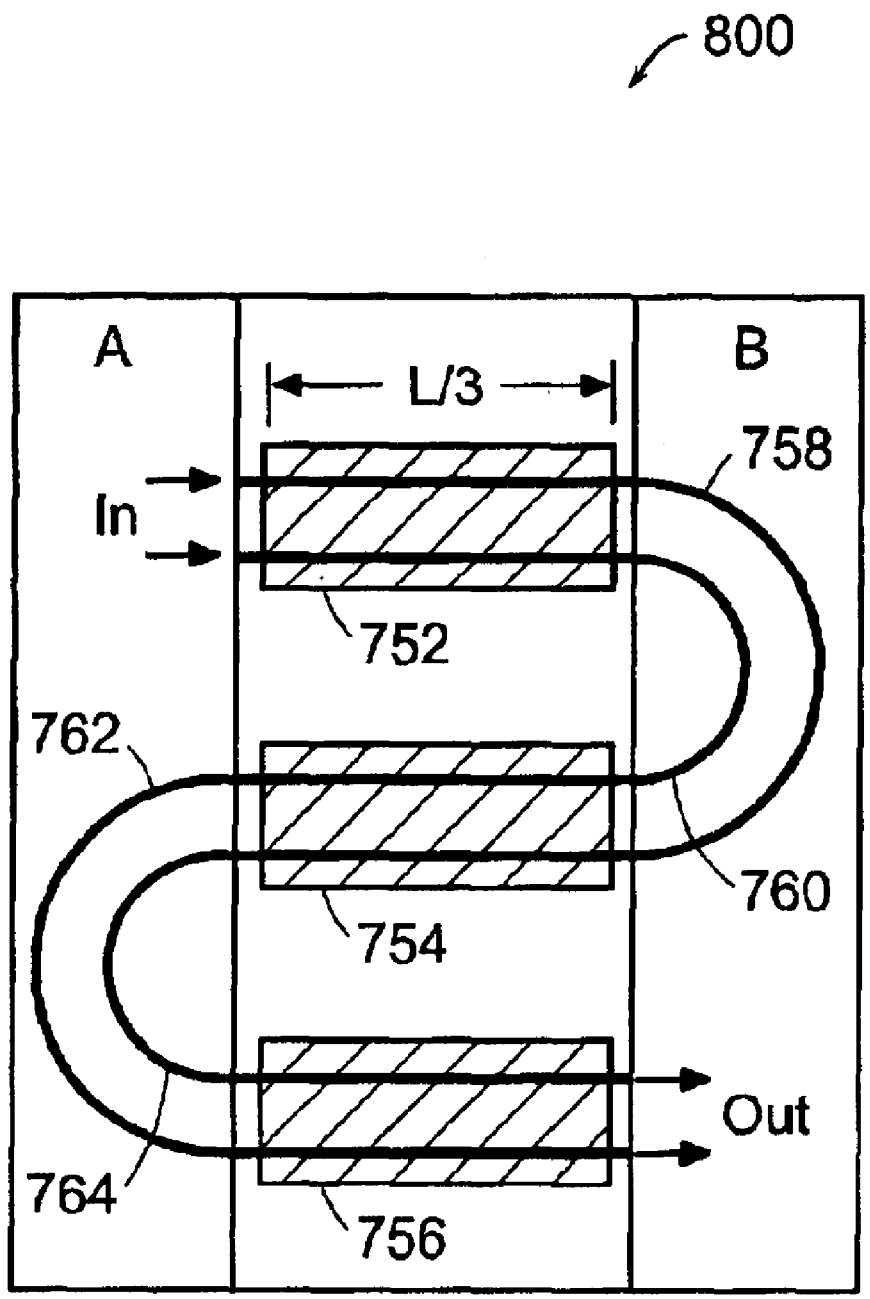
FIG. 14 illustrates another embodiment of the multi-segment interaction region according to the present invention where the segments are connected by means of uncrossed waveguide turns.

FIG. 14 illustrates another embodiment of the multi-segment interaction region 800 according to the present invention that uses semicircular waveguides to optically couple the interaction regions. In this embodiment, the semicircular waveguides do not cross. This embodiment is advantageous because it reduces the possibility of undesirable coupling between the semicircular waveguides.

Figure 15:
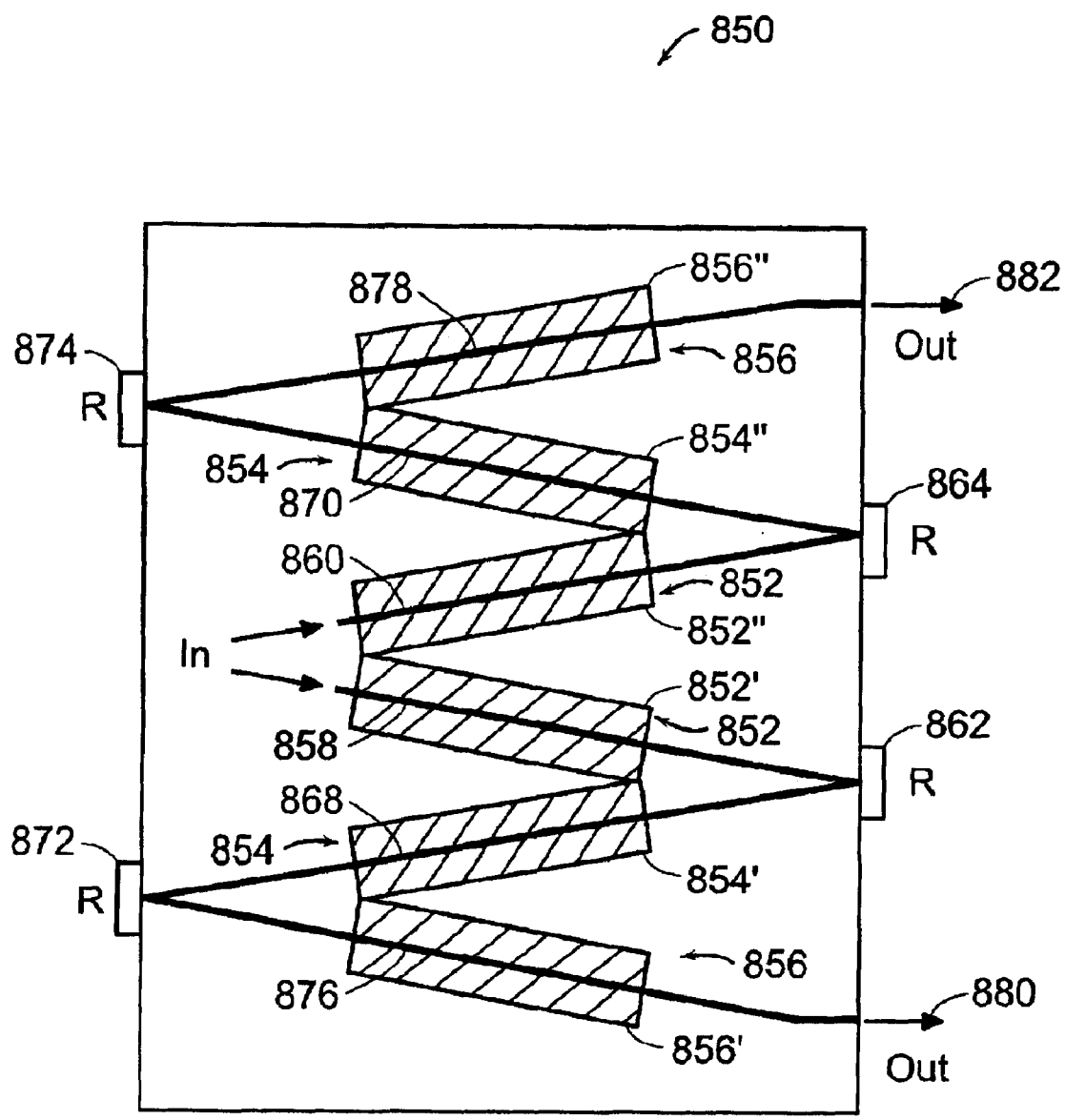
FIG. 15 illustrates an embodiment of the multi-segment interaction region according to the present invention that includes non-parallel interaction regions.

FIG. 15 illustrates another embodiment of the multi-segment interaction region 850 of an AOTF device according to the present invention that includes non-parallel interaction regions. The multi-segment interaction region 850 includes a first 852' and second segment 852" of a first interaction region 852, a first 854' and a second segment 854" of the second interaction region 854 and a first 856' and a second segment 856" of a third interaction region 856.

The first 852' and the second segments 852" of the first interaction region 852 include a first 858 and a second optical waveguide 860, respectively, that extend through the first interaction region 852 to a first 862 and a second reflector 864, respectively. Similarly, the first 854' and the second segments 854" of the second interaction region 854 include a first 868 and a second optical waveguide 870, respectively, that extend through the second interaction region 854 to a third 872 and a fourth reflector 874, respectively. The first 856' and the second segments 856" of the third interaction region 856 include a first 876 and a second optical waveguide 878, respectively, that extend through the third interaction region 856 to a first 880 and a second output 882, respectively.

Fabricating the interaction regions in a non-parallel configuration allows the use of straight waveguide sections, which simplifies the design and fabrication of the waveguides. However, fabricating the interaction regions in a non-parallel configuration can lower the birefringence slightly and, therefore, can increase the required interaction length. It may also be necessary to re-orient the acoustic wave generator section (not shown) to compensate for acoustic walk-off.

There are numerous advantages of AOTF devices using the multi-segment interaction region 850 of the present invention. One advantage is that the substrates can have a much lower (more nearly 1:1) aspect ratio. For example, a three-segment AOTF device according to the present invention having a total interaction length of 6.7 cm can have an interaction region about 2.2 cm long and can be approximately 1 cm wide. The aspect ratio for such a device is approximately 2.2. In contrast, a prior art single-segment interaction region occupying the same area is approximately 6.7 cm long and about 0.3 cm wide. The aspect ratio for such a prior art device is 22.3, which is an order of magnitude higher.

The lower aspect ratio achieved with AOTF devices according to the present invention has numerous advantages over prior art devices. For example, low aspect ratio AOTF devices according to the present invention are more physically robust, easier to package, require smaller heaters or coolers and require less complex temperature controllers. Also, low-aspect ratio AOTF devices according to the present invention have better performance because they have more uniform material properties and less rigid fabrication tolerances. In addition, low-aspect ratio AOTF devices according to the present invention are generally less expensive to manufacture because more devices will fit on a given size substrate.

The multi-segment interaction region of the present invention can be used with any optical device that includes an optical interaction region such as an AOTF or a modulator.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An acousto-optic tunable filter comprising:
   a) a polarization beamsplitter receiving an optical signal at a first optical input, the polarization beamsplitter generating a first and a second polarized optical signal at a first and a second optical output, respectively;
   b) a first optical interaction region having a first and a second optical waveguide optically coupled to the first and the second optical outputs of the polarization beamsplitter, respectively, and having a first acoustic wave generator for generating acoustic waves in at least one of the first and the second optical waveguides, the first optical interaction region generating a first and a second partially mode-converted polarized optical signal;
   c) a second optical interaction region having a third and a fourth optical waveguide optically coupled to the first and the second optical waveguides of the first optical interaction region, respectively, and having a second acoustic wave generator for generating acoustic waves in at least one of the third and the fourth optical waveguides, the second optical interaction region being non-collinear relative to the first optical interaction region, the second optical interaction region substantially mode-converting the first and the second partially mode-converted polarized optical signals; and
   d) a polarization beam combiner having a first and a second optical input optically coupled to the third and the fourth optical waveguides of the second optical interaction region, respectively, the polarization beam combiner combining the substantially mode-converted first and second polarized optical signals to generate a substantially mode-converted optical signal at a first optical output in response to the acoustic waves generated by at least one of the first and the second acoustic wave generators.

2. The acousto-optic tunable filter of claim 1 wherein the polarization beam combiner generates a non-mode-converted optical signal at a second optical output.

3. The acousto-optic tunable filter of claim 1 wherein the substantially mode-converted optical signal is phased-matched to the acoustic waves generated by at least one of the first and the second acoustic wave generators.

4. The acousto-optic tunable filter of claim 1 wherein the substantially mode-converted optical signal comprises a wavelength that is inversely proportional to the frequency of the acoustic waves generated by at least one of the first and the second acoustic wave generators.

5. The acousto-optic tunable filter or claim 1 wherein the second optical interaction region that is non-collinear relative to the first optical interaction region reduces an aspect ratio of the acousto-optic tunable filter.

6. The acousto-optic tunable filter of claim 1 wherein the first polarized optical signal is orthogonally polarized relative to the second polarized optical signal.

7. The acousto-optic tunable filter of claim 1 wherein a phase of the acoustic waves generated by the second acoustic wave generator is adjusted such that polarization mode conversion in the second optical interaction region is substantially coherent with polarization mode conversion in the first optical interaction region.

8. The acousto-optic tunable filter of claim 1 further comprising a third optical interaction region having a fifth and a sixth optical waveguide optically coupled to the third and the fourth optical waveguides, respectively, and having a third acoustic wave generator for generating acoustic waves in the fifth and the sixth optical waveguides, the third optical interaction region being non-collinear relative to at least one of the first optical interaction region and the second optical interaction region, thereby reducing the aspect ratio of the acousto-optic tunable filter.

9. The acousto-optic tunable filter or claim 8 wherein a phase of the acoustic waves generated by the third acoustic wave generator is adjusted such that polarization mode conversion in the third optical interaction region is substantially coherent with polarization mode conversion in at least one of the first optical interaction region and the second optical interaction region.

10. The acousto-optic tunable filter of claim 1 wherein the acousto-optic tunable filter optically processes a WDM optical signal in a WDM optical communication system.

11. The acousto-optic tunable filter of claim 1 wherein the polarization beamsplitter, the first optical interaction region, the second optical interaction region, and the polarization beam combiner are integrated on a single substrate.

12. The acousto-optic tunable filter of claim 1 wherein at least one of the polarization beamsplitter, the first optical interaction region, the second optical interaction region, and the polarization beam combiner comprises a discrete planar device.

13. The acousto-optic tunable filter of claim 12 wherein the discrete planar device is formed on a physically separate substrate.

14. The acousto-optic tunable filter of claim 1 wherein the polarization beamsplitter comprises a prism.

15. The acousto-optic tunable filter of claim 1 wherein the first optical interaction region and the second optical interaction region are discrete planar devices that are formed in a first and a second substrate, respectively, the first and the second substrates being physically separate.

16. The acousto-optic tunable filter of claim 1 wherein the first and the second optical interaction regions are positioned adjacent to each other in a folded configuration.

17. The acousto-optic tunable filter of claim 1 wherein the first and the second optical interaction regions are positioned in a non-parallel configuration relative to each other.

18. The acousto-optic tunable filter of claim 1 wherein at least one of the first optical interaction region and the second optical interaction region comprises a first and a second segment, wherein the first and the second segments are physically separate.

19. The acousto-optic tunable filter of claim 1 wherein the third optical waveguide and the fourth optical waveguide are optically coupled to the first optical waveguide and the second optical waveguide, respectively, with a first and a second optical fiber.

20. The acousto-optic tunable filter of claim 19 wherein the first optical fiber and the second optical fiber are positioned in a V-groove block.

21. The acousto-optic tunable filter of claim 1 wherein the third optical waveguide and the fourth optical waveguide are optically coupled to the first optical waveguide and the second optical waveguide with a fifth and a sixth optical waveguide, respectively.

22. The acousto-optic tunable filter of claim 21 wherein the fifth and the sixth optical waveguides are curved.

23. The acousto-optic tunable filter of claim 21 wherein the fifth optical waveguide and the sixth optical waveguide do not cross.

24. The acousto-optic tunable filter of claim 21 wherein the fifth and the sixth optical waveguides comprise ridge waveguides.

25. The acousto-optic tunable filter of claim 21 wherein the fifth and the sixth optical waveguides comprise channel waveguides.

26. The acousto-optic tunable filter of claim 21 wherein the fifth and the sixth optical waveguides are disposed on discrete substrates.

27. A multi-segment acousto-optic interaction region comprising:
   a) a first optical interaction region comprising a first optical waveguide having a first optical input and a first optical output, and a first acoustic wave generator for generating acoustic waves in the first optical waveguide, the first optical interaction region generating a partially mode-converted optical signal; and
   b) a second optical interaction region that is non-collinear relative to the first optical interaction region, the second optical interaction region comprising a second optical waveguide having a second optical input that is optically coupled to the first optical output of the first optical interaction region and a second acoustic wave generator for generating acoustic waves in the second optical waveguide, the second optical interaction region substantially mode-converting the partially mode-converted optical signal in response to acoustic waves generated by at least one of the first and the second acoustic wave generators.

28. The multi-segment acousto-optic interaction region of claim 27 wherein the second optical input of the second optical waveguide is optically coupled to the first optical output of the first optical interaction region by an optical fiber.

29. The multi-segment acousto-optic interaction region of claim 27 wherein the second optical input is optically coupled to the first optical output by an optical waveguide.

30. The multi-segment acousto-optic interaction region of claim 29 wherein the optical waveguide comprises a ridge optical waveguide.

31. The multi-segment acousto-optic interaction region of claim 29 wherein the optical waveguide comprises a channel optical waveguide.

32. The multi-segment acousto-optic interaction region of claim 27 further comprising a third optical interaction region, the third optical interaction region comprising a third optical waveguide having a third optical input that is optically coupled to the second optical output of the second optical interaction region, and a third acoustic wave generator for generating acoustic waves in the third optical waveguide, the third optical interaction region generating a substantially mode-converted optical signal in response to acoustic waves generated by at least one of the first, the second, and the third acoustic wave generators.

33. The multi-segment acousto-optic interaction region of claim 32 wherein the third optical interaction region is non-collinear relative to at least one of the first optical interaction region and the second optical interaction region.

34. A method of mode-converting an optical signal, the method comprising:
   a) generating acoustic waves in a first optical interaction region;
   b) propagating the optical signal through the first optical interaction region to generate a partially mode-converted optical signal;
   C) generating acoustic waves in a second optical interaction region that is non-collinear relative to the first optical interaction region; and
   d) propagating the partially mode-converted optical signal through the second optical interaction region, thereby substantially mode-converting the partially mode-converted optical signal in response to the acoustic waves generated in the first and the second optical interaction regions.

35. The method of claim 34 wherein the first and the second optical interaction regions are positioned adjacent to each other in a folded configuration.

36. The method of claim 34 wherein the first and the second optical interaction regions are positioned in a non-parallel configuration relative to each other.

37. The method of claim 34 further comprising propagating the optical signal from the first optical interaction region into the second optical interaction region with an optical fiber.

38. An acousto-optic tunable filter comprising:
   a) means for generating acoustic waves in a first optical interaction region;
   b) means for propagating a first and a second polarized optical signal through the first optical interaction region to generate partially mode-converted first and second polarized optical signals;
   c) means for generating acoustic waves in a second optical interaction region, the second optical interaction region being non-collinear relative to the first optical interaction region;

d) means for propagating the partially mode-converted first and second polarized optical signals through the second optical interaction region to generate substantially mode-converted first and second polarized optical signals; and e) means for combining the substantially mode-converted first and second polarized optical signals to generate a substantially mode-converted optical signal in response to the acoustic waves generated in the first and the second optical interaction regions.

39. The acousto-optic tunable filter of claim 38 wherein the first polarized optical signal is orthogonally polarized relative to the second polarized optical signal.

40. The acousto-optic tunable filter at claim 38 further comprising:

a) means for generating acoustic waves in a third optical interaction region, the third optical interaction region being non-collinear relative to at least one of the first and the second optical interaction regions; and b) means for propagating the partially mode-converted first and second optical signals through the third optical interaction region.

41. The acousto-optic tunable filter of claim 38 wherein the means for generating a first and a second polarized optical signal comprises a polarization beamsplitter.

42. The acousto-optic tunable filter of claim 38 wherein the means for combining the substantially mode-converted first and second optical signals comprises a polarization beam combiner.

43. The acousto-optic tunable filter of claim 38 wherein the means for propagating the first and the second optical signals through the first optical interaction region comprises a first and a second optical waveguide.

44. The acousto-optic tunable filter of claim 38 wherein the means for propagating the partially mode-converted first and second optical signals through the second optical interaction region comprises a first and a second optical waveguide.

* * * * *